United States Patent
Fang et al.

(10) Patent No.: US 11,403,632 B2
(45) Date of Patent: Aug. 2, 2022

(54) MANAGING TRANSACTIONS IN MULTIPLE BLOCKCHAIN NETWORKS

(71) Applicant: Alipay Labs (Singapore) Pte. Ltd., Singapore (SG)

(72) Inventors: Hui Fang, Hangzhou (CN); Yuan Yuan, Hangzhou (CN); Shengjiao Cao, Hangzhou (CN); Weitao Yang, Hangzhou (CN)

(73) Assignee: ALIPAY LABS (SINGAPORE) PTE. Ltd., Singapore (SG)

( * ) Notice: Subject to any disclaimer, the term of this patent is extended or adjusted under 35 U.S.C. 154(b) by 0 days.

(21) Appl. No.: 17/359,464

(22) Filed: Jun. 25, 2021

(65) Prior Publication Data

US 2021/0326869 A1   Oct. 21, 2021

(30) Foreign Application Priority Data

Jul. 3, 2020 (SG) .............. 10202006447V

(51) Int. Cl.
| | |
|---|---|
| *G06Q 20/06* | (2012.01) |
| *G06Q 20/38* | (2012.01) |
| *G06Q 20/40* | (2012.01) |

(52) U.S. Cl.
CPC ....... *G06Q 20/3827* (2013.01); *G06Q 20/381* (2013.01); *G06Q 20/3823* (2013.01); *G06Q 20/38215* (2013.01)

(58) Field of Classification Search
CPC ............. G06Q 20/3827; G06Q 20/381; G06Q 20/38215; G06Q 20/3823

(Continued)

(56) References Cited

U.S. PATENT DOCUMENTS 9,608,829 B2 *  3/2017  Spanos ................ H04L 9/3242
9,785,369 B1 * 10/2017  Ateniese ................ H04L 9/14
(Continued)

FOREIGN PATENT DOCUMENTS

| CN | 109214818 | 1/2019 |
|---|---|---|
| CN | 109409877 | 3/2019 |

(Continued)

OTHER PUBLICATIONS

EP Extended Search Report in European Application No. 21179261.9, dated Oct. 12, 2021, 9 pages.

(Continued)

*Primary Examiner* — Clifford B Madamba
(74) *Attorney, Agent, or Firm* — Fish & Richardson P.C.

(57) ABSTRACT

Disclosed are computer-implemented methods, non-transitory computer-readable media, and systems for managing transactions in blockchain networks. One computer-implemented method includes identifying a first Hash Time Locked Contract (HTLC) transaction in a first blockchain network that is associated with a second HTLC transaction in a second blockchain network different from the first blockchain network, identifying a third HTLC transaction in the second blockchain network that is associated with the second HTLC transaction, identifying a fourth HTLC transaction in the first blockchain network that is associated with the first, second, and third HTLC transactions, the first, second, third, and fourth HTLC transactions being related to a cross-chain transaction across the first and second blockchain networks, and deriving hidden information of the cross-chain transaction from information of the first, second, third, and fourth HTLC transactions based on associations of the first, second, third and fourth HTLC transactions.

27 Claims, 12 Drawing Sheets

(58) Field of Classification Search
USPC .......................................................... 705/44
See application file for complete search history.

(56) References Cited

U.S. PATENT DOCUMENTS

| | | | |
|---|---|---|---|
| 10,652,019 B1 | 5/2020 | Nicolas et al. | |
| 2016/0292672 A1* | 10/2016 | Fay | G06Q 20/3829 |
| 2016/0330034 A1* | 11/2016 | Back | H04L 9/3255 |
| 2017/0212781 A1* | 7/2017 | Dillenberger | G06F 9/5038 |
| 2017/0374049 A1* | 12/2017 | Ateniese | H04L 9/3242 |
| 2020/0175003 A1 | 6/2020 | Jiang et al. | |

FOREIGN PATENT DOCUMENTS

| | | |
|---|---|---|
| CN | 111144883 | 5/2020 |
| CN | 111161062 | 5/2020 |

OTHER PUBLICATIONS github.com [online], "BTS ETH-atomic_swaps/ READEME.md", Sep. 1, 2019, retrieved on Sep. 24, 2019, retrieved from URL<https://github.com/Fy45/BTS-ETH-atomic_swaps/blob/82756ba880920585393e8f00e1a872bb26353f1 a/README.md>, 7 pages.

Leonard et al, "Atomic Swapping Bitcoins and Ethers", IEEE Xplore, Oct. 1, 2019, 4 pages.

Robinson, "Consensus for Crosschain Communications," arXiv, Apr. 18, 2020, 15 pages.

Andersson et al, Evaluating Cross-chain Settlement and Exchange in Cryptocurrency, Jun. 10, 2019, Umea University: Masters Thesis, 53 pages.

Crosby et al., "BlockChain Technology: Beyond Bitcoin," Sutardja Center for Entrepreneurship & Technology Technical Report, Oct. 16, 2015, 35 pages.

Herlihy et al, "Atomic Cross-Chain Swaps," Proceedings of the 2018 ACM Symposium on Principles of Distributed Computing, May 18, 2018, 10 pages.

Miraz et al, "Atomic Cross-chain Swaps: Development, Trajectory and Potential of Non-monetary Digital Token Swap Facilities," Annals of Emerging Technologies in Computing (AETiC), Jan. 1, 2019, 10 pages.

Nakamoto, "Bitcoin: A Peer-to-Peer Electronic Cash System," www.bitcoin.org, 2005, 9 pages.

\* cited by examiner

MANAGING TRANSACTIONS IN MULTIPLE BLOCKCHAIN NETWORKS

CROSS-REFERENCE TO RELATED APPLICATIONS

This application claims priority to Singapore Patent Application No. 10202006447V, filed on Jul. 3, 2020, which is hereby incorporated by reference in its entirety.

TECHNICAL FIELD

This specification relates to managing transactions in multiple blockchain networks.

BACKGROUND

A ledger is typically used to record a history of transactions, such as economic and financial activities in an organization. Applications with ledger-like functionality, such as custom audit tables or audit trails created in relational databases, have been built to maintain an accurate history of applications' data. However, building such applications is time-consuming and prone to human error. Also, as the relational databases are not inherently immutable, any changes to the data are hard to track and verify.

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

In some cases, users make transactions in multiple different blockchain networks. For example, an atomic swap enables trading assets across different blockchain networks without using an intermediary party (or an exchange service) in the process. These transactions may be implicitly related to each other but are difficult to be identified, which may cause issues for entities such as financial institutions when identifying activities of their customers.

Therefore, it would be desirable to effectively managing transactions in multiple blockchain networks, particularly identifying associated transactions in the multiple blockchain networks and deriving corresponding hidden information.

SUMMARY

Described embodiments of the subject matter can include one or more features, alone or in combination.

For example, in one embodiment, a computer-implemented method for managing transactions in multiple blockchain networks includes: identifying a first transaction in a first blockchain network that is a first Hash Time Locked Contract (HTLC) transaction in the first blockchain network by a computing system; identifying a second transaction in a second blockchain network that is a second HTLC transaction in the second blockchain network by the computing system, the second blockchain network being different from the first blockchain network; determining that a first transaction commit time of the first HTLC transaction is earlier than a second transaction commit time of the second HTLC transaction and that a first secret hash of the first HTLC transaction has a same value as a second secret hash of the second HTLC transaction by the computing system; and in response to determining that the first transaction commit time is earlier than the second transaction commit time and the first secret hash has the same value as the second secret hash, determining that the first HTLC transaction in the first blockchain network is associated with the second HTLC transaction in the second blockchain network and that the first HTLC transaction and the second HTLC transaction are related to a cross-chain transaction by the computing system.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, the computer-implemented method further includes: determining that a first expiration time in the first transaction is longer than a sum of a second expiration time in the second transaction and a time threshold by the computing system. Determining that the first transaction in the first blockchain network is associated with the second transaction in the second blockchain network is in response to determining that the first expiration time is longer than the sum of the second expiration time and the time threshold.

In some embodiments, the time threshold is determined at least partially based on a difference between a network time of the first blockchain network and a network time of the second blockchain network.

In some embodiments, the first expiration time, the second expiration time, and the time threshold are configured such that a third HTLC transaction corresponding to the second HTLC transaction is executed in the second blockchain network before a fourth HTLC transaction corresponding to the first HTLC transaction is executed in the first blockchain network, and the first HTLC transaction and the fourth HTLC transaction are associated with a first HTLC in the first blockchain network, and the second HTLC transaction and the third HTLC transaction are associated with a second HTLC in the second blockchain network.

In some embodiments, the first HTLC is configured such that the first HTLC transaction is abandoned after the first expiration time such that a transferred value in the first HTLC transaction is refunded, and the second HTLC is configured such that the second HTLC transaction is abandoned after the second expiration time such that a transferred value in the second HTLC transaction is refunded.

In some embodiments, the computer-implemented method further includes: determining that a ratio between a first transferred value in the first transaction and a second transferred value in the second transaction is within a ratio range by the computing system. Determining that the first transaction in the first blockchain network is associated with the second transaction in the second blockchain network is in response to determining that the ratio between the first transferred value and the second transferred value is within the ratio range.

In some embodiments, the first blockchain network is associated with a first currency and the second blockchain network is associated with a second currency, and the ratio range is predetermined by a variation of a ratio between the first currency and the second currency.

In some embodiments, the variation of the ratio between the first currency and the second currency is before the first transaction commit time of the first transaction in the first blockchain network.

In some embodiments, the computer-implemented method further includes: identifying a third transaction in the second blockchain network is a third HTLC transaction in the second blockchain network by the computing system; determining that a third transaction commit time of the third HTLC transaction is later than the second transaction commit time of the second HTLC transaction and that a third receiver address of the third HTLC transaction is same as a second receiver address of the second HTLC transaction by the computing system; determining that a hash of a proof in the third HTLC transaction has a same value as the second secret hash of the second HTLC transaction by the computing system; and in response to determining that the third transaction commit time is later than the second transaction commit time, the third receiver address is the same as the second receiver address, and the hash of the proof in the third HTLC transaction has the same value as the second secret hash of the second HTLC transaction, determining that the third HTLC transaction is associated with the second HTLC transaction and that the first, second, and third HTLC transactions are related to the cross-chain transaction by the computing system.

In some embodiments, the computer-implemented method further includes: identifying a fourth transaction in the first blockchain network that is a fourth HTLC transaction in the first blockchain network by the computing system; determining that a fourth transaction commit time of the fourth HTLC transaction is later than the third transaction commit time of the third HTLC transaction, that a fourth receiver address of the fourth HTLC transaction is same as a first receiver address of the first HTLC transaction, and that a proof in the fourth HTLC transaction is same as the proof in the third HTLC transaction by the computing system; and in response to determining that the fourth transaction commit time is later than the third transaction commit time, the fourth receiver address is the same as the first receiver address, and the proof in the fourth HTLC transaction is the same as the proof in the third HTLC transaction, determining that the fourth transaction is associated with the first transaction, the second transaction, and the third transaction and that the first, second, third, and fourth transactions are related to the cross-chain transaction by the computing system.

In some embodiments, the computer-implemented method further includes: deriving hidden information of the cross-chain transaction from information of the first, second, third, and fourth transactions based on associations of the first, second, third, and fourth transactions by the computing system.

In some embodiments, the information of each of the first and second transactions includes at least one of a sender address, a receiver address, a transferred value, a transaction commit time, a secret hash, or an expiration time, and the information of each of the third and fourth transactions includes at least one of a sender address, a receiver address, a transferred value, a transaction commit time, or a proof.

In some embodiments, the hidden information of the cross-chain transaction includes at least one of: a first party that has at least one of a first sender address of the first transaction or a third sender address of the third transaction, a second party that has at least one of a second sender address of the second transaction or a fourth sender address of the fourth transaction, an exchange that is an exchange between a first transferred value of the first transaction and a second transferred value of the second transaction, or an exchange ratio that is a ratio between the first transferred value in the first transaction and the second transferred value in the second transaction.

In some embodiments, the hidden information of the cross-chain transaction includes: the first party having the first sender address and the third sender address, the second party having the second sender address and the fourth sender address, the exchange being the exchange between the first transferred value and the second transferred value, and the exchange ratio being the ratio between the first transferred value and the second transferred value.

In some embodiments, the computer-implemented method includes: rendering the information of the first, second, third, and fourth transactions in a visualization on a user interface; and annotating the associations of the first, second, third, and fourth transactions in the visualization.

In some embodiments, the computer-implemented method includes: determining that a transaction is an HTLC transaction by determining that the transaction is executed according to an HTLC protocol.

In some embodiments, determining that the transaction is executed according to an HTLC protocol includes determining that information of the transaction comprises a secret hash as a hash lock and an expiration time as a time lock, the transaction being configured to be abandoned after the expiration time such that a transferred value in the transaction is refunded.

In some embodiments, the computer-implemented method includes: presenting information of the transactions in the multiple blockchain networks in a data structure by the computing system; modifying the data structure by connecting associated information among the transactions by the computing system; and determining at least one cross-chain transaction related to the transactions and hidden information of the at least one cross-chain transaction based on the modified data structure by the computing system.

In some embodiments, each of the multiple blockchain networks is associated with a different corresponding currency.

In another embodiment, a computer-implemented method for managing transactions in multiple blockchain networks includes: identifying a first Hash Time Locked Contract (HTLC) transaction in a first blockchain network that is associated with a second HTLC transaction in a second blockchain network by a computing system, the second blockchain network being different from the first blockchain network; identifying a third HTLC transaction in the second blockchain network that is associated with the second HTLC transaction in the second blockchain network by the computing system; identifying a fourth HTLC transaction in the first blockchain network that is associated with the first, second, and third HTLC transactions by the computing system, where the first, second, third, and fourth HTLC transactions are related to a cross-chain transaction across the first blockchain network and the second blockchain network; and deriving hidden information of the cross-chain transaction from information of the first, second, third, and fourth HTLC transactions based on associations of the first, second, third, and fourth HTLC transactions by the computing system.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, the information of each of the first and second HTLC transactions includes at least one of a sender address, a receiver address, a transferred value, a transaction commit time, a secret hash, or an expiration time, and the information of each of the third and fourth HTLC transactions includes at least one of a sender address, a receiver address, a transferred value, a transaction commit time, or a proof.

In some embodiments, the hidden information of the cross-chain transaction includes at least one of: a first party of the cross-chain transaction, where deriving hidden information of the cross-chain transaction from information of the first, second, third, and fourth HTLC transactions includes determining the first party of the cross-chain transaction to have at least one of a sender address of the first HTLC transaction or a sender address of the third HTLC transaction, a second party of the cross-chain transaction, where deriving hidden information of the cross-chain transaction from information of the first, second, third, and fourth HTLC transactions includes determining the second party of the cross-chain transaction to have at least one of a sender address of the second HTLC transaction or a sender address of the fourth HTLC transaction, an exchange of the cross-chain transaction, where deriving hidden information of the cross-chain transaction from information of the first, second, third, and fourth HTLC transactions includes determining the exchange of the cross-chain transaction to be an exchange between a first transferred value in the first HTLC transaction and a second transferred value in the second HTLC transaction, or an exchange ratio between the first transferred value in the first HTLC transaction and the second transferred value in the second HTLC transaction.

In some embodiments, the hidden information of the cross-chain transaction includes: the first party having the sender address of the first HTLC transaction and the sender address of the third HTLC transaction, the second party having the sender address of the second HTLC transaction and the sender address of the fourth HTLC transaction, the exchange being the exchange between the first transferred value and the second transferred value, and the exchange ratio being a ratio between the first transferred value and the second transferred value.

In some embodiments, identifying the first HTLC transaction in the first blockchain network that is associated with the second HTLC transaction in the second blockchain network includes: determining that a transaction commit time of the second HTLC transaction is later than a transaction commit time of the first HTLC transaction, and determining that a secret hash of the second HTLC transaction has a same value as a secret hash of the first HTLC transaction.

In some embodiments, identifying the first HTLC transaction in the first blockchain network is associated with the second HTLC transaction in the second blockchain network further includes at least one of: determining that an expiration time of the first HTLC transaction is longer than a sum of an expiration time of the second HTLC transaction and a time threshold, or determining that a ratio between a transferred value of the first transaction and a transferred value of the second transaction is within a ratio range.

In some embodiments, the first blockchain network is associated with a first currency and the second blockchain network is associated with a second currency, and the ratio range is predetermined by a variation of a ratio between the first currency and the second currency.

In some embodiments, the variation of the ratio between the first currency and the second currency is before the transaction commit time of the first HTLC transaction in the first blockchain network.

In some embodiments, the expiration time of the first HTLC transaction, the expiration time of the second HTLC transaction, and the time threshold are configured such that the third HTLC transaction associated with the second HTLC transaction is executed in the second blockchain network before the fourth HTLC transaction associated with the first HTLC transaction is executed in the first blockchain network.

In some embodiments, the time threshold is determined at least partially based on a difference between a network time of the first blockchain network and a network time of the second blockchain network.

In some embodiments, identifying the third HTLC transaction in the second blockchain network that is associated with the second HTLC transaction in the second blockchain network includes: determining that a transaction commit time of the third HTLC transaction is later than a transaction commit time of the second HTLC transaction, determining that a receiver address of the third HTLC transaction is same as a receiver address of the second HTLC transaction, and determining that a hash of a proof in the third HTLC transaction has a same value as a secret hash of the second HTLC transaction.

In some embodiments, identifying a fourth HTLC transaction in the first blockchain network that is associated with the first, second, and third HTLC transactions includes: determining that a transaction commit time of the fourth HTLC transaction is later than a transaction commit time of the third HTLC transaction, determining that a proof in the fourth HTLC transaction is identical to a proof of the third HTLC transaction, and determining that a receiver address of the fourth HTLC transaction is same as a receiver address of the first HTLC transaction.

In some embodiments, the computer-implemented method includes: determining that a transaction is an HTLC transaction by determining that the transaction is executed according to an HTLC protocol.

In some embodiments, determining that the transaction is executed according to the HTLC protocol includes: determining that information of the transaction comprises a secret hash as a hash lock and an expiration time as a time lock, the transaction being configured to be abandoned after the expiration time such that a transferred value in the transaction is refunded.

In some embodiments, the computer-implemented method includes: rendering the information of the first, second, third, and fourth HTLC transactions in a visualization on a user interface; and annotating the associations of the first, second, third, and fourth HTLC transactions in the visualization.

In some embodiments, the computer-implemented method includes: presenting information of transactions published in the multiple blockchain networks in a data structure by the computing system; modifying the data structure by connecting associated information among the transactions by the computing system; and determining at least one cross-chain transaction related to the transactions and hidden information of the at least one cross-chain transaction based on the modified data structure by the computing system.

In some embodiments, the first, second, third, and fourth HTLC transactions are executed sequentially in time.

In some embodiments, each of the multiple blockchain networks is associated with a different corresponding currency.

In a further embodiment, a computer-implemented method for managing transactions in multiple blockchain networks includes: accessing transaction data stored in the multiple blockchain networks by a computing system, the transaction data including transactions published in the multiple blockchain networks, each of the multiple blockchain networks being different from each other; identifying, based on the transactions published in the multiple blockchain networks, multiple cross-chain transactions across the multiple blockchain networks by the computing system, each of the multiple cross-chain transactions being related to a corresponding set of transactions published on at least two of the blockchain networks, the corresponding set of transactions being associated with one another; deriving hidden information of each of the multiple cross-chain transactions based on an association of the corresponding set of transactions by the computing system; and deriving hidden information between the multiple cross-chain transactions based on the hidden information of each of the multiple cross-chain transactions by the computing system.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, identifying the multiple cross-chain transactions includes: identifying a first cross-chain transaction across a first blockchain network and a second blockchain network of the blockchain networks by identifying first, second, third, and fourth Hash Time Locked Contract (HTLC) transactions that are related to the first cross-chain transaction, the first and fourth HTLC transactions being in a first blockchain network of the blockchain networks, the second and third HTLC transactions being in a second blockchain network of the blockchain networks, and identifying a second cross-chain transaction across the first blockchain network and the second blockchain network by identifying fifth, sixth, seventh, and eighth HTLC transactions that are related to the second cross-chain transaction, the fifth and eighth HTLC transactions being in the first blockchain network, the sixth and seventh HTLC transactions being in the second blockchain network.

In some embodiments, identifying the first cross-chain transaction across the first blockchain network and the second blockchain network includes: identifying the first HTLC transaction in the first blockchain network that is associated with the second HTLC transaction in the second blockchain network; identifying the third HTLC transaction in the second blockchain network that is associated with the second HTLC transaction in the second blockchain network; and identifying the fourth HTLC transaction in the first blockchain network that is associated with the first, second, and third HTLC transactions.

In some embodiments, identifying the second cross-chain transaction across the first blockchain network and the second blockchain network includes: identifying the fifth HTLC transaction in the first blockchain network that is associated with the sixth HTLC transaction in the second blockchain network; identifying the seventh HTLC transaction in the second blockchain network that is associated with the sixth HTLC transaction in the second blockchain network; and identifying the eighth HTLC transaction in the first blockchain network that is associated with the fifth, sixth, and seventh HTLC transactions.

In some embodiments, the first, second, third, and fourth HTLC transactions are executed sequentially in time, the fifth, sixth, seventh, and eighth HTLC transactions are executed sequentially in time, and the first, fifth, sixth, seventh, eighth, second, third, and fourth HTLC transactions are executed sequentially in time.

In some embodiments, deriving hidden information of each of the multiple cross-chain transactions based on an association of the corresponding set of transactions includes: deriving first hidden information of the first cross-chain transaction from information of the first, second, third, and fourth HTLC transactions based on associations of the first, second, third, and fourth HTLC transactions; and deriving second hidden information from information of the fifth, sixth, seventh, and eighth HTLC transactions based on associations of the fifth, sixth, seventh, and eighth HTLC transactions.

In some embodiments, the information of each of the first, second, fifth and sixth HTLC transactions comprises at least one of a sender address, a receiver address, a transferred value, a transaction commit time, a secret hash, or an expiration time, and the information of each of the third, fourth, seventh, and eighth HTLC transactions comprises at least one of a sender address, a receiver address, a transferred value, a transaction commit time, or a proof.

In some embodiments, the first hidden information of the first cross-chain transaction comprises at least one of: a first party of the first cross-chain transaction, where deriving first hidden information of the first cross-chain transaction from information of the first, second, third, and fourth HTLC transactions includes determining the first party of the first cross-chain transaction to have at least one of a first sender address of the first HTLC transaction or a third sender address of the third HTLC transaction, or a second party of the first cross-chain transaction, where deriving first hidden information of the cross-chain transaction from information of the first, second, third, and fourth HTLC transactions includes determining the second party of the cross-chain transaction to have at least one of a second sender address of the second HTLC transaction or a fourth sender address of the fourth HTLC transaction.

In some embodiments, the second hidden information of the second cross-chain transaction includes at least one of: a third party of the second cross-chain transaction, where deriving second hidden information from information of the fifth, sixth, seventh, and eighth HTLC transactions includes determining the third party of the third cross-chain transaction to have at least one of a fifth sender address of the fifth HTLC transaction or a seventh sender address of the seventh HTLC transaction, or a fourth party of the second cross-chain transaction, where deriving second hidden information from information of the fifth, sixth, seventh, and eighth HTLC transactions includes determining the fourth party of the second cross-chain transaction to have at least one of a sixth sender address of the sixth HTLC transaction or an eighth sender address of the eighth HTLC transaction.

In some embodiments, the first hidden information of the first cross-chain transaction further includes at least one of: an exchange of the first cross-chain transaction, wherein deriving first hidden information of the first cross-chain transaction from information of the first, second, third, and fourth HTLC transactions includes determining the exchange of the first cross-chain transaction to be an exchange between a first transferred value in the first HTLC transaction and a second transferred value in the second HTLC transaction, or an exchange ratio of the first cross-chain transaction, wherein deriving first hidden information of the first cross-chain transaction from information of the first, second, third, and fourth HTLC transactions comprises determining the exchange ratio of the first cross-chain transaction to be a ratio between the first transferred value in the first HTLC transaction and the second transferred value in the second HTLC transaction.

In some embodiments, the second hidden information of the second cross-chain transaction further includes at least one of: an exchange of the second cross-chain transaction, where deriving second hidden information of the second cross-chain transaction from information of the fifth, sixth, seventh, and eighth HTLC transactions includes determining the exchange of the second cross-chain transaction to be an exchange between a fifth transferred value in the fifth HTLC transaction and a fifth transferred value in the sixth HTLC transaction, or an exchange ratio of the second cross-chain transaction, wherein deriving second hidden information of the second cross-chain transaction from information of the fifth, sixth, seventh, and eighth HTLC transactions includes determining the exchange ratio of the second cross-chain transaction to be a ratio between the fifth transferred value in the fifth HTLC transaction and the sixth transferred value in the sixth HTLC transaction.

In some embodiments, the first hidden information of the first cross-chain transaction includes: the first party having the first sender address and the third sender address, the second party having the second sender address and the fourth sender address, the exchange being the exchange between the first transferred value and the second transferred value, and the exchange ratio being a ratio between the first transferred value and the second transferred value.

In some embodiments, the second hidden information of the second cross-chain transaction includes: the third party having the fifth sender address and the seventh sender address, the fourth party having the sixth sender address and the eighth sender address, the exchange being the exchange between the fifth transferred value and the sixth transferred value, and the exchange ratio being a ratio between the fifth transferred value and the sixth transferred value.

In some embodiments, deriving hidden information between the multiple cross-chain transactions based on the hidden information of each of the multiple cross-chain transactions includes: comparing the first hidden information of the first cross-chain transaction associated with the first, second, third, and fourth HTLC transactions and the second hidden information of the second cross-chain transaction associated with the fifth, sixth, seventh, and eighth HTLC transactions; determining that a sender address of the fourth HTLC transaction is same as a sender address of the fifth HTLC transaction in the first blockchain network and that a sender address of the second HTLC transaction is same as a sender address of the seventh HTLC transaction in the second blockchain network; and determining the third party to be the second party.

In some embodiments, deriving hidden information between the multiple cross-chain transactions based on the hidden information of each of the multiple cross-chain transactions further includes: comparing the information of the first, second, third, and fourth HTLC transactions and the information of the fifth, sixth, seventh, and eighth HTLC transactions; determining that transferred values of the first, fourth, fifth, and eighth HTLC transactions are identical to each other and that transferred values of the second, third, sixth, and seventh HTLC transactions are identical to each other; and determining that the second party is a middleman for a trade between the first party and the fourth party and that the transferred value of the first HTLC transaction associated with the first party is traded with the transferred value of the sixth HTLC transaction associated with the fourth party.

In some embodiments, the hidden information between the first and second cross-chain transactions include that the third party is the second party and is a middleman for a trade between the first party and the fourth party and that the exchange to be an exchange between the transferred value of the first HTLC transaction and the transferred value of the sixth HTLC transaction.

In some embodiments, each of the transactions corresponding to the multiple cross-chain transactions is a Hash Time Locked Contract (HTLC) transaction, and the computer-implemented method includes determining that a transaction is an HTLC transaction by determining that the transaction is executed according to an HTLC protocol.

In some embodiments, determining that the transaction is executed according to the HTLC protocol includes: determining that information of the transaction comprises a secret hash as a hash lock and an expiration time as a time lock, the transaction being configured to be abandoned after the expiration time such that a transferred value in the transaction is refunded.

In some embodiments, the computer-implemented method includes: rendering information of the transactions published in the multiple blockchain networks in a visualization on a user interface; and annotating the associations of the transactions in the visualization.

In some embodiments, the computer-implemented method includes: presenting information of the transactions published in the multiple blockchain networks in a data structure by the computing system; modifying the data structure by connecting associated information among the transactions by the computing system; determining the multiple cross-chain transactions related to the transactions based on the data structure by the computing system; deriving the hidden information of each of the multiple cross-chain transactions based on the data structure by the computing system; modifying the data structure by the hidden information of each of the multiple cross-chain transactions by the computing system; and deriving the hidden information between the multiple cross-chain transactions based on the data structure by the computing system.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
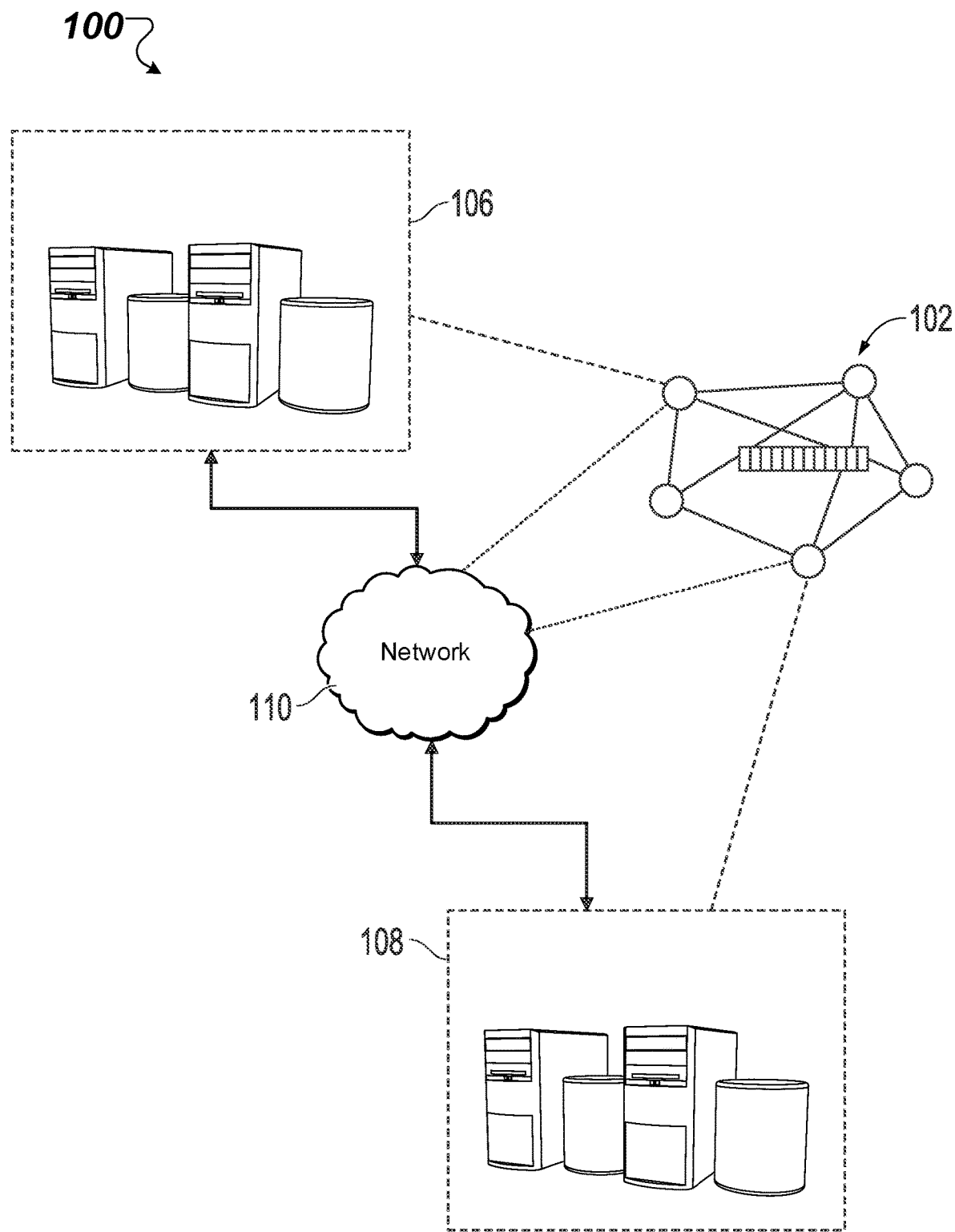
FIG. 1 is a diagram illustrating an example of an environment that can be used to execute embodiments of this specification.

This specification describes technologies for managing transactions in multiple blockchain networks. These technologies generally involve identifying associated transactions in the blockchain networks and deriving corresponding hidden information. The associated transactions can be related to one or more cross-chain transactions across at least two blockchain networks. A cross-chain transaction can be, for example, a trade or transfer between at least two parties over at least two blockchain networks. A cross-chain transaction can be related to multiple blockchain transactions executed in two or more blockchain networks. The hidden information of the cross-chain transactions can include trading parties and their associated accounts in the blockchain networks, exchanges (e.g., swaps) between transferred values, and exchange ratios. The technologies can help entities such as financial institutions or auditing authorities to better manage cross-chain transactions of customers, users, or parties of interest, to better track or supervise their activities.

The techniques described in this specification produce several technical effects. In some embodiments, the techniques described in this specification include algorithms and systems that perform data mining to automatically uncover hidden information of published blockchain transactions stored in one or more blockchain networks. A blockchain transaction (also simply referred to as a transaction) can include data, instructions, or operations to be executed by a blockchain node in a blockchain network. The blockchain transaction can be generated, for example, by a client device or a participating system of the blockchain network. A blockchain node can receive the blockchain transaction, perform consensus processing on the blockchain transaction, and, after the consensus is reached, publish the blockchain transaction by saving the blockchain transaction into a block of a blockchain for persistent storage. In some embodiments, the described algorithms and systems can perform data mining on published blockchain transactions in blockchain networks to identify underlying associated blockchain transactions within in each of the blockchain networks, transactions that are related to one or more cross-chain transactions between or among the multiple blockchain networks, and derive hidden information related to the cross-chain transactions. For example, the techniques described in this specification can perform data mining on published transaction data stored in the multiple blockchain networks to identify cross-chain transactions or atomic swaps, to determine relationships between the published transactions and/or relationships between the multiple cross-chain transactions, to determine parties involved in these transactions and their relationships, and/or to determine values exchanged or swapped and the exchange rates in these transactions. For example, if Alice and Bob perform an atomic swap on two blockchain networks, e.g., ETHEREUM (ETH) blockchain network and BITCOIN (BTC) blockchain network, the techniques can automatically discover or otherwise identify that Alice is involved in a first transaction of storing 30 ETHs in a first HTLC address in the ETH blockchain network and a third transaction of retrieving 3 BTCs from a second HTLC address in the BTC blockchain network, Bob is involved in a second transaction of storing 3 BTCs in the second HTLC address in the BTC blockchain network and a fourth transaction of retrieving 30 ETHs from the first HTLC address in the ETH blockchain network, the exchange is 30 ETHs for 3 BTCs, and the exchange rate is 10 ETHs for 1 BTC.

In some embodiments, the technologies are applied to tracking and supervising flows of funds in scenarios of multi-chain and/or multi-user transactions. For example, transactions conducted with assets (e.g., cryptocurrencies or tokens) in blockchain networks can have high anonymity and privacy requirements, which makes it difficult for financial institutions to perform know-your-customer (KYC) operations, e.g., identifying repeated financing and related internal transactions, or auditing or management authorities for auditing a flow of funds and tracking and supervising. This issue becomes even more serious with the existence of multiple blockchain networks or side-chain (or child-chain) networks. The techniques described in this specification can help these entities or authorities to better track the multi-chain and/or multi-user transactions.

In some embodiments, the techniques described in this specification can perform data mining on the published blockchain transactions to determine, for example, what transactions (e.g., atomic swaps or cross-chain transactions) a party of interest is involved in the multiple blockchain networks, what the values of these transactions are, and who the other parties trading with the party of interest are.

In some embodiments, the techniques described in this specification can be applied to decentralized transactions such as atomic swaps or decentralized exchanges. Traditional centralized exchanges can be vulnerable to hacks and are subject to mismanagement and government regulations, and may not be able to handle large volume demands. In contrast, an atomic swap or a decentralized exchange is a peer-to-peer exchange from one party to another, without going through a third party service such as an exchange agency or authority (e.g., a currency exchange agency). In some embodiments, the techniques described in this specification can retrieve decentralized transactions published or otherwise stored in blockchain networks or distributed networks, perform data mining or other analyses on the decentralized transactions based on underlying relationship or association among the decentralized transactions, and derive hidden information from the decentralized transactions to help corresponding entities or authorities to automatic and streamline transaction monitoring and management in a more efficient manner.

In some embodiments, the technologies described in this specification can be applied to Hash Time Lock Contract (HTLC) transactions and help expand the use of the HTLC transactions to applications or systems which the HTLC transactions have not been able to be supported. An HTLC protocol can be developed to ensure that no fraud occurs on parties of a decentralized peer-to-peer transaction so that the decentralized transaction can be successfully completed in an atomic swap. As the parties of the decentralized transaction do not need to establish trust, HTLC provides a degree of confidentiality to the parties of the transaction. Thus, outsiders of the transactions may have a hard time knowing that the transactions occurring in the blockchain networks are related, which may limit the use of HTLC enabled atomic swaps, for example, in cases where knowledge of the transactions are required for monitoring and regulation purposes for corresponding entities or authorities. The technologies described in this specification can derive hidden information in the HTLC enabled atomic swaps or HTLC enabled cross-chain transactions. In some embodiments, entities associated with the blockchain or distributive networks, e.g., financial institutions such as banks, can allow their customers or users to use HTLC enabled atomic swaps without concerns on difficulties of tracking the customers' financial activities.

In some embodiments, the techniques described in this specification can be applied to two or more blockchain networks that can provide access to transaction data. For example, the blockchain networks can include a blockchain-based ledger system such as a consortium blockchain network, a side-chain (or child-chain) network, a private blockchain network, a public blockchain network, or any suitable combination thereof. The two or more blockchain networks can be different from each other, for example, be implemented based on different blockchain platforms or technologies, and/or can support different assets (e.g., different cryptocurrencies or tokens). The two or more blockchain networks can support cross-chain transactions, for example, by using appropriate interfaces or relays for performing operations or interactions between the two or more blockchain networks. In some embodiments, the techniques described in this specification can be applied to scenarios where multiple parties, e.g., 2, 3, 4, or more parties, perform cross-chain transactions across multiple blockchain networks, e.g., 2, 3, 4 or more blockchain networks. The technologies described in this specification can derive information that is related to the cross-chain transactions but is hidden from the transactions published in respective blockchain networks. For example, if Alice and Bob perform a first atomic swap on two blockchain networks and Bob and Cathy perform a second atomic swap on the same blockchain networks, the techniques can automatically discover or otherwise identify that Bob is a middleman for Alice and Cathy by comparing information of the first and second atomic swaps.

In some embodiments, the techniques described in this specification can identify relationships or associations between or among multiple transactions, and store the relationship or identified transaction information in a graph, table, or other data structure for more efficient access or management of the information. In some embodiments, the techniques described in this specification can present the relationship or identified transaction information on a graph or another visualization, for example, on a user interface, by connecting associated information on the graph, which can facilitate view, review, and further analysis of the transactions, and further improve the efficiency of access or management of those transaction and identified information.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a hash of the previous block. Each block also includes a local timestamp (e.g., provided by a computing device that generates the block or a computing system that manages the blockchain), its own hash, and one or more transactions. For example, the block can include a block header and a block body. The block header can include the local timestamp, its own hash, and a hash of the previous block. The block body can include payload information such as the one or more transactions (or transaction data). The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

In some embodiments, a centralized ledger system can also adopt the data structure of a blockchain to leverage immutability, reliability, and trustworthiness of data stored on a blockchain. In some embodiments, such a centralized ledger system can be referred to as a blockchain-based centralized ledger system or a universal auditable ledger service system. In some embodiments, the blockchain-based centralized ledger system can include a central trusted authority that provides transparent, immutable, and cryptographically verifiable data that are stored in blocks of a blockchain data structure. The stored data can be in a log format, including, for example, not only for transaction logs but also other transaction data and block data. Due to the existence of the central trusted authority, the blockchain-based centralized ledger system does not need to perform consensus processes to establish trust. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

In some embodiments, the centralized ledger system can be a node of a blockchain network. For example, the centralized ledger system can be a non-consensus node in the blockchain network and can provide highly reliable and high-performance auditable streaming ledger services for the consensus nodes or other non-consensus nodes in the blockchain network, or entities outside of the blockchain network.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing systems include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
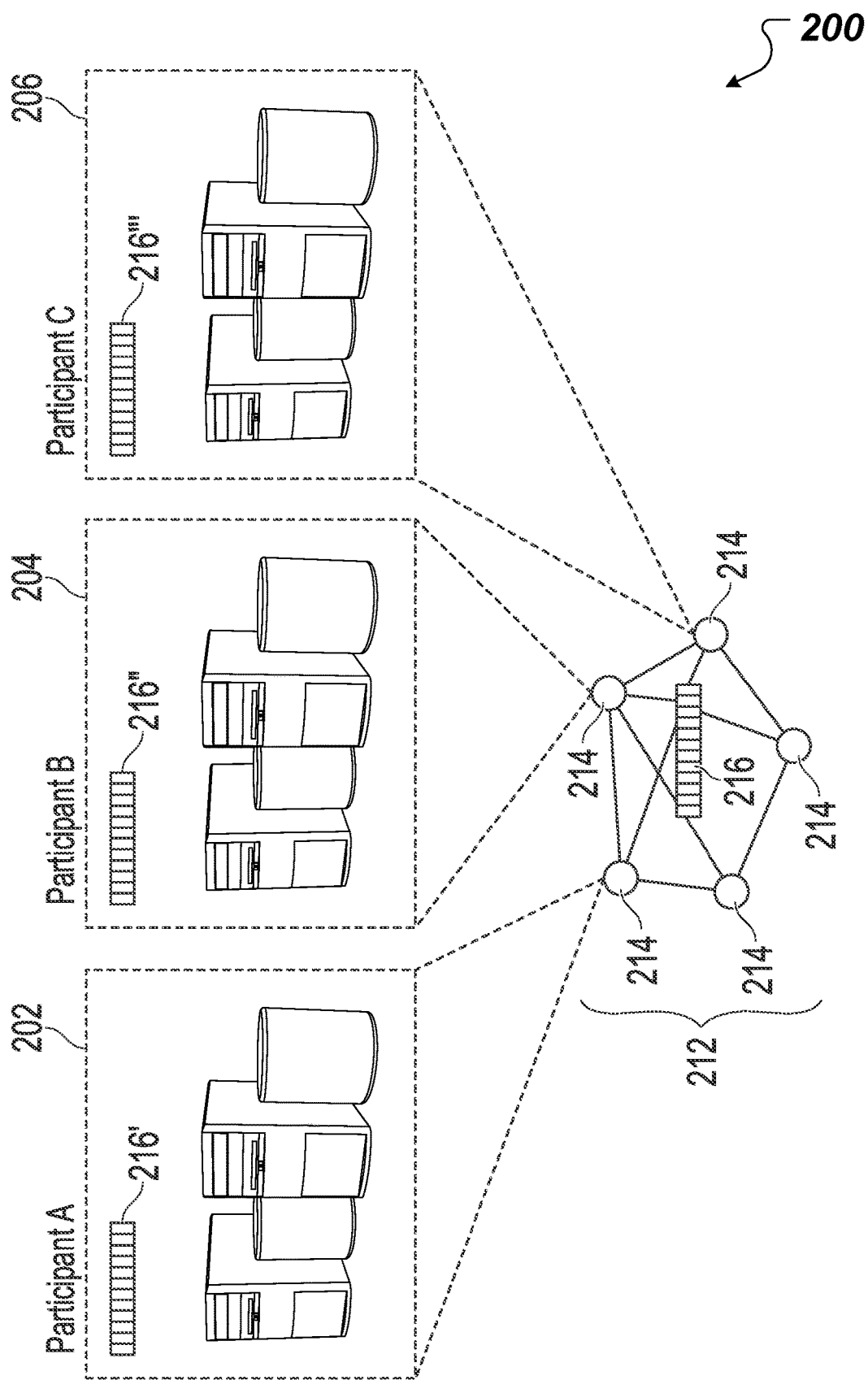
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216'''of the blockchain 216.

A blockchain (e.g., the blockchain 216 of FIG. 2) is made up of a chain of blocks, each block storing data. Examples of data include transaction data representative of a transaction between two or more participants. Transaction data is used as an example of data record stored in the blockchain. Examples of a transaction can include, without limitation, exchanges of something of value (e.g., assets, products, services, currency). In some embodiments, one or more operations executed in the ledger system can be stored as transaction data in the blockchain. For example, the transaction data can include one or more operations or manipulations of data stored in the block chain, information (e.g., timestamp information) obtained from an external resource, or any appropriate data can be stored in a blockchain (e.g., documents, images, videos, audio). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some cases, parties can make transactions between each other in multiple blockchain networks, e.g., ETHEREUM (ETH) blockchain network and BITCOIN (BTC) blockchain network, that are different and independent from each other. The parties can be users or clients of the participant system 202, 204, or 206. Each party can use a client device, e.g., a computing system such as a computer, to make a transaction in a blockchain network through the participant system. The transactions can include a transfer, payment, management, or another type operation on a digital asset.

In some examples, atomic swaps allow assets (e.g., currencies, cryptocurrencies, and/or tokens) on two independent blockchain networks to conduct atomic cross-chain transactions without relying on third-party trust endorsements. The term "atomic" means that the transaction will either succeed or fail without a third state. For example, Alice and Bob want to exchange a certain amount of cryptocurrency A and cryptocurrency B. Without using a centralized exchange, the two parties Alice and Bob first need to agree on an exchange ratio (or rate) of the two cryptocurrencies, and then through atomic swaps, Alice sends an amount of A to Bob, and Bob sends an amount of B to Alice. However, transactions on the blockchain networks are irreversible. In the absence of a centralized endorsement, transactions in different blockchain network involve sequential issues. For example, if Alice sends the amount of A to Bob first, then Alice is in a disadvantage position because she is not sure whether Bob will send an amount of B to her as agreed.

To ensure that decentralized peer-to-peer transactions can be successfully completed, e.g., in atomic swaps, a mechanism or protocol, e.g., Hash Time Lock Contract (HTLC) protocol, can be developed to ensure that no fraud occurs on either party. The HTLC protocol can be configured to lock a given transaction with a hash and time and to only execute the transaction if specified conditions are met. For example, the HTLC protocol can use one or more hash locks (or hashlocks) and time locks (or timelocks) to require parties of a transaction to perform certain operation; or otherwise the transaction will not be fully performed or part of performed operations of the transaction can be rolled back or forfeited. In some embodiments, the HTLC protocol can define a hash of a redeemable secret as a hash lock and an expiration time as a time lock. In some embodiments, transactions pursuant to or otherwise based on HTLC protocol (also referred to as HTLC transactions) can be implemented by pre-deployed smart contracts in the blockchain networks to allow parties to perform their respective operations for the redeemable secret within the expiration time. As an example of an HTLC transaction, a payment channel can established between a payer (e.g., a sender of a payment) and a payee (e.g., a receiver of the payment). The payee may need to perform certain operations (e.g., unlocking the hash lock to acknowledge receiving the payment by generating cryptographic proof of payment) prior to a deadline defined by the time lock. Otherwise, the payee forfeits the ability to claim the payment and the payment will be returned to the payer. The payer can get a refund after the expiration time defined by the time lock. The HTLC protocol can be used for bidirectional and routing payment channels.

Transactions without third-party trust endorsements and/or in multiple blockchain networks can be implicitly related to each other without being explicitly identified or readily identifiable from each individual transaction, which may cause issues for entities such as financing institutions to perform KYC operations, e.g., repeated financing and related internal transactions. These issues can also exist when using algorithms or protocols such as HTLCs to do operations for cross-chain transactions, e.g., exchange transactions such as swap transactions. In some examples, an exchange transaction is a reciprocal transfer between two entities that results in one of the entities acquiring assets or services or satisfying liabilities by surrendering other assets or services or incurring other obligations. In some examples, a swap transaction is a contract to exchange two financial liabilities and can include an interest rate swap, a basis swap, a currency swap, an inflation swap, a credit default swap, a commodity swap, an equity swaps, and/or any other type of swap.

In some embodiments, identifying overlapping or matching addresses in a blockchain network can be used to identify associated transactions. However, it is difficult to identify cross-chain transactions such as HTLC transactions for exchange transactions. In addition to providing the atomicity of the transaction, HTLC also provides a degree of confidentiality to both parties of the transaction, as the two parties of the transaction do not need to establish trust. Thus, outsiders (or external parties) of the transaction may not know that the transactions occurring on the two blockchain networks are related.

Figure 3:
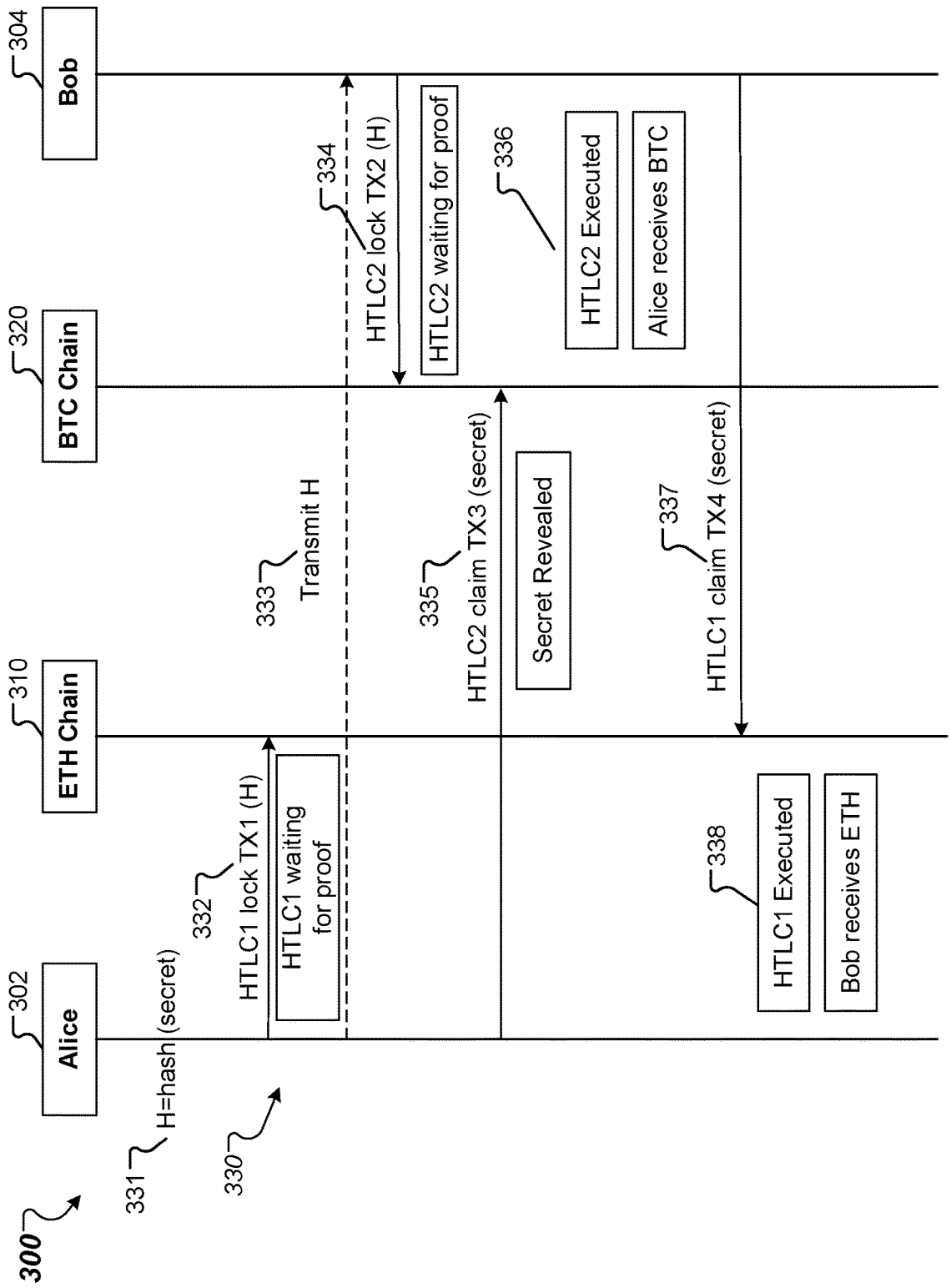
FIG. 3 is a diagram illustrating an example of a cross-chain transaction across multiple blockchain networks in accordance with embodiments of this specification.
Figure 4:
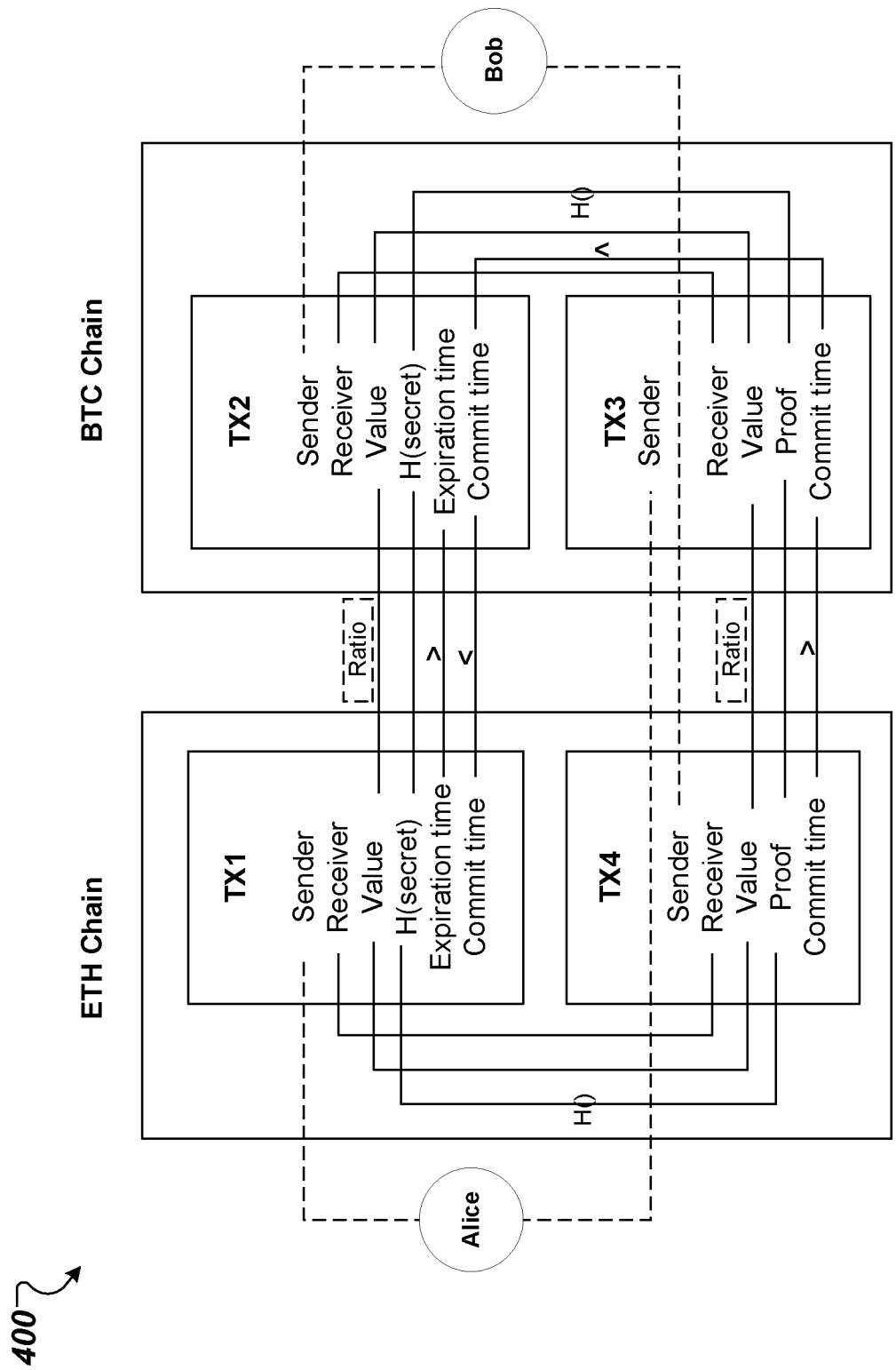
FIG. 4 shows a graph illustrating hidden information and known information in the cross-chain transaction of FIG. 3 in accordance with embodiments of this specification.
Figure 5:
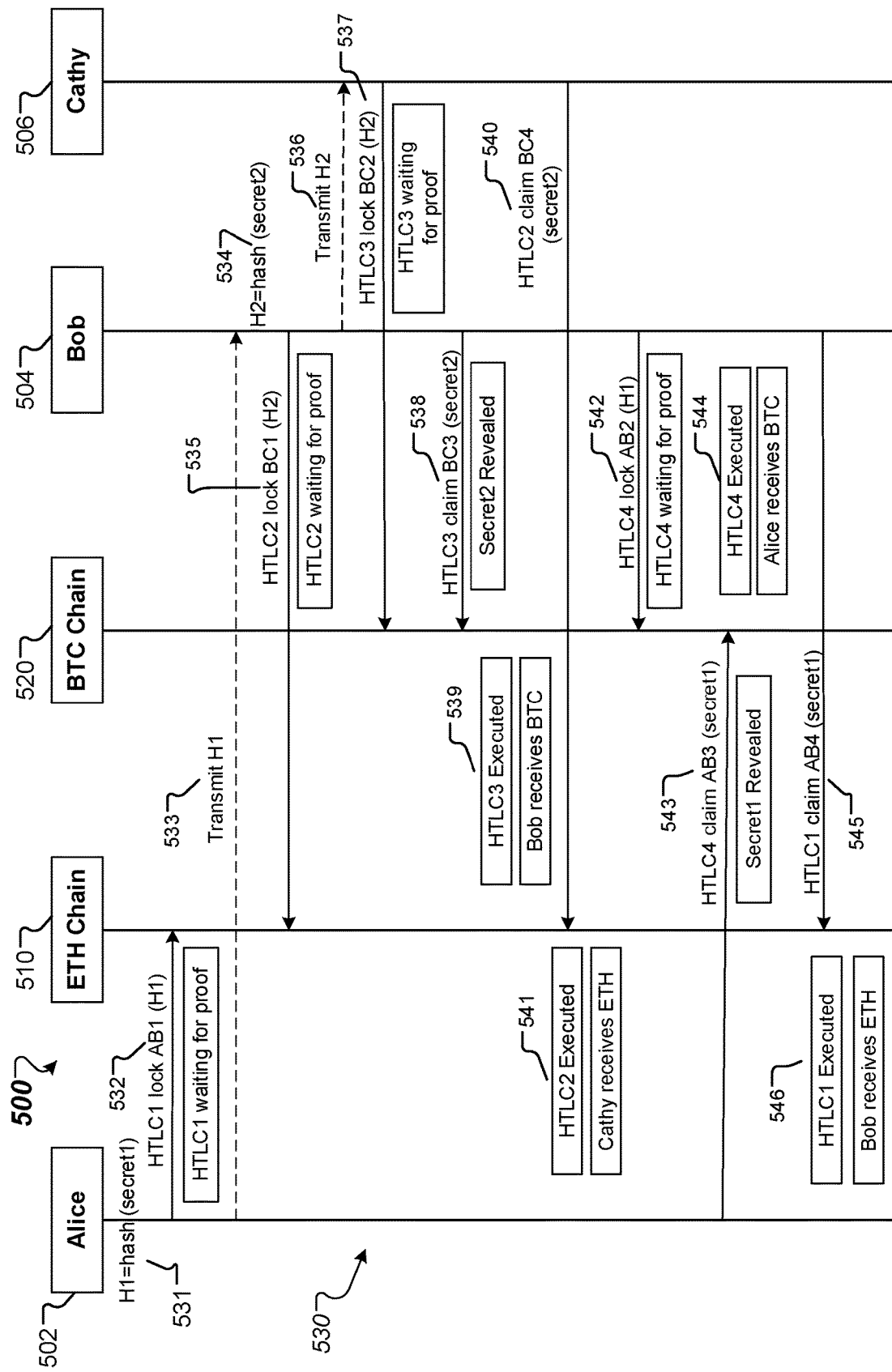
FIG. 5 is a diagram illustrating an example of multiple cross-chain transactions across multiple blockchain networks in accordance with embodiments of this specification.
Figure 6:
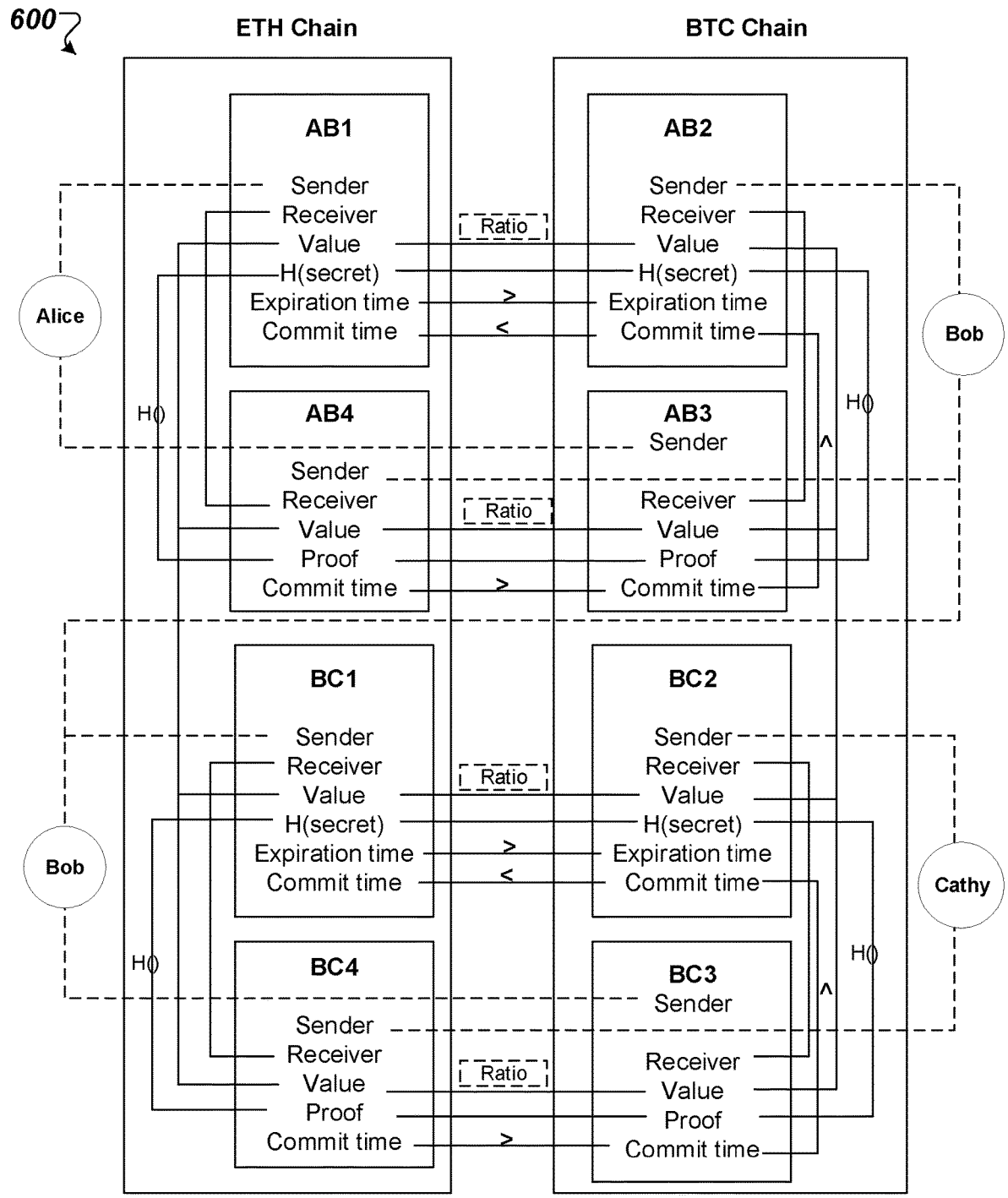
FIG. 6 shows a graph illustrating hidden information and known information in the multiple cross-chain transactions of FIG. 5 in accordance with embodiments of this specification.

Implementations of this specification provide techniques for managing transactions in multiple blockchain networks, particularly, for identifying associated transactions in the blockchain networks and related cross-chain transactions across the blockchain networks and deriving hidden information of the cross-chain transactions based on the associated transactions. The techniques can be implemented for multiple parties (e.g., 2, 3, 4, or more parties) to perform one or more cross-chain transactions across multiple blockchain networks (e.g., 2, 3, 4, or more blockchain networks). For illustration purposes, in the following, FIGS. 3 and 4 are described with respect to two parties (Alice and Bob) and two blockchain networks (ETH and BTC blockchain networks); FIGS. 5 and 6 are described with respect to three parties (Alice, Bob, and Cathy) and two blockchain networks (ETH and BTC blockchain networks). The parties can have different names or annotations. The blockchain networks can include any other types of blockchain networks.

FIG. 3 is a diagram illustrating an example 300 of a cross-chain transaction across multiple blockchain networks in accordance with embodiments of this specification. Each of the blockchain networks can be the blockchain network 102 of FIG. 1 or 212 of FIG. 2. The blockchain networks can be different and independent from each other. In some embodiments, the blockchain networks are different blockchain network instances based on the same or different blockchain platforms. For example, as illustrated in FIG. 3, the blockchain networks include ETHEREUM (ETH) blockchain network 310 and BITCOIN (BTC) blockchain network 320. Each blockchain network can support a respective type of assets or values (e.g., a respective currency or cryptocurrency) such as ETH for the blockchain network 310 and BTC for the blockchain network 320.

In some embodiments, a cross-chain transaction can be between two parties 302 and 304 (e.g., Alice and Bob). Each of the parties can be a user (or a client) of a participant system of a blockchain network, e.g., participant system 202, 204, or 206 of FIG. 2. The participant system can function as a network node of the blockchain network 310 or 320, e.g., node 214 of FIG. 2. The user can use a client device, e.g., a computing device, to communicate with the blockchain network through the participant system.

A party can have a respective account (or an account address) in one or more of the blockchain networks 310 and 320. For example, Alice can have a unique ETH account in the ETH blockchain network 310 and a unique BTC account in the BTC blockchain network 320. Bob can also have a unique ETH account in the ETH blockchain network 310 and a unique account BTC in the BTC blockchain network 320. Alice can hold a number of ETHs in her ETH account and Bob can hold a number of BTCs in his BTC account.

For illustration, assuming that Alice wants to trade a certain amount of ETHs, e.g., 30 ETHs, for BTCs, e.g., 3 BTCs, with Bob according to an HTLC protocol, FIG. 3 illustrates a process 330 as an example of process for performing the cross-chain transaction between Alice and Bob across the ETH blockchain network 310 and BTC blockchain network 320.

In some embodiments, a smart contract for generating and managing transactions according to an HTLC (also referred to as HTLC transactions) can be created and delayed in each of the ETH blockchain network 310 and BTC blockchain network 320. The smart contract can also be referred to as an HTLC smart contract. In some embodiments, the HTLC smart contract can be created and initiated by an administrator of blockchain network, one or more parties of a transaction, or another appropriate entity.

In some embodiments, a network node (e.g., a participant system) of a blockchain network can send a transaction that includes information about creating a smart contract to a blockchain network. Each network node of the blockchain network can execute the transaction. For example, for an ETHEREUM (ETH) blockchain network, each network node of the ETHEREUM blockchain network can run an ETHEREUM virtual machine (EVM). The EVM is a Turing-complete virtual machine, through which various types of complex logic can be implemented. A smart contract published and invoked by a user in an ETHEREUM blockchain network can run on the EVM. In some embodiments, the EVM directly runs virtual machine code (virtual machine byte code, also referred to as byte code), and the smart contract deployed on the blockchain network can includes byte code or any other type of code.

After an agreement is reached among nodes through a consensus mechanism, the smart contract can be successfully created. A contract account corresponding to the smart contract can appear on the blockchain and have a specific address. For example, each network node of the blockchain network can have the address of the created contract account. Behavior of the smart contract can be controlled by the code written in the smart contract, and a state of the smart contract can also be stored, for example, in a storage of the contract account. In other words, the smart contract enables a virtual account including the code and the storage of the account for recording the state of the smart contract to be generated on the blockchain. After the smart contract is created, the user can invoke or otherwise call the smart contract to perform functions defined in the smart contract, for example, by initiating a transaction pointing to the address of the smart contract account. An EVM of each network node can separately execute the transaction, so that smart contract code can run on the virtual machine of each network node in the blockchain network in a distributed way.

In some embodiments, the HTLC smart contract can include computer-executable codes that provide functions such as creating an HTLC (e.g., by specifying the hash lock, time lock or other parameters or conditions of the HTLC), creating an HTLC transaction pursuant to an HTLC, verifying whether a transaction is an HTLC transaction or not, determining whether to execute the HTLC transaction based on conditions specified in a corresponding HTLC, executing an HTLC transaction, etc. In some embodiments, a first HTLC smart contract can be deployed in the ETH blockchain network 310, and a second HTLC contract can be deployed in the BTC blockchain network 320. A participant system (e.g., associated with Alice) of the ETH blockchain network 310 can invoke an HTLC transaction to call any function defined in the first HTLC smart contract by initiating a transaction with an address of the first HTLC smart contract in the ETH blockchain network 310. Similarly, a participant system (e.g., associated with Bob) of the BTC blockchain network 320 can invoke another HTLC transaction to call any function defined in the second HTLC smart contract by initiating a transaction with an address of the second HTLC smart contract in the BTC blockchain network 320.

As an example, Alice can first use her client device, e.g., through the participant system, to create a secret and then calculate a hash of the secret based on a hash function at step 331, where H=hash (secret). The hash function can be selected by Alice. The hash function can be, for example, SHA256. The secret and the hash of the secret can be used to create a hash lock of an HTLC.

Then, Alice can use the client device to execute a transaction (TX), TX1, in the ETH blockchain network 310 at step 332. In TX1, Alice can invoke the first HTLC smart contract using the address of the first HTLC smart contract in the ETH blockchain network 310 to initialize parameters of the first HTLC smart contract. For example, the secret hash H can be set as a hash lock to be an output of the first HTLC. A condition can be configured for the first HTLC where one knowing the secret can use the secret as a proof to obtain the H value in the first HTLC to obtain the to-be-transferred value from Alice. For example, Alice sets the to-be-transferred value is 30 ETHs, and sends 30 ETHs to the account address of the first HTLC smart contract. Alice can also set an expiration time t1 as a time lock for the hash lock in the first HTLC. That is, within the expiration time, anyone who provides the secret as the proof can get the to-be-transferred value in the TX1, e.g., 30 ETHs stored at the first HTLC smart contract address. If the secret has not been provided as the proof to the first HTLC within the expiration time, the TX1 can be abandoned and the transferred value is refunded to Alice, e.g., to her ETC account in the ETH blockchain network 310. In some embodiments, the expiration time t1 can be, for example, as a default or a configurable time period. In some embodiments, the expiration time t1 can be configured to correspond to a number of blocks to be generated by the ETH blockchain network 310, or based on another event or time unit.

In some embodiments, to enable that only an authorized or designated entity, e.g., Bob, can retrieve the transferred value using the secret, Alice can create an encrypted digital lockbox that can be opened only by the secret and the designated entity's unique key (e.g., a signature or other unique identifier). That is, Alice can set the first HTLC such that only Bob can open Alice's lockbox. In some embodiments, if there is an issue in the transaction process or the designated entity suddenly withdraws and the lockbox is not opened within an agreed time (e.g., an expiration time), the transferred value stored in the lockbox will be refunded to Alice.

In some examples, an HTLC can be implemented as follows:

```
IF
    # Payment if you have the secret R
    HASH160 <H> EQUAL VERIFY
    <Payee Public Key>CHECKSIG
ELSE
    # Refund after timeout
    <lock time> CHECKLOCKTIMEVERIFY DROP
``` where EQUALVERIFY implements the hash lock, CHECKLOCKTIMEVERIFY implements the time lock, and CHECKSIG implements the requirement of a designated entity's signature.

Anyone who knows the corresponding secret that can make the hash value equal to H can redeem the output by calling the first clause of the IF statement. If the secret is not disclosed, it is stated in the HTLC that after a certain number of blocks defined by a time lock, the payee can use the second clause in the IF statement to request a refund. This is an example implementation of HTLC using a script. An HTLC can be implemented using other functions, languages, or logics. Anyone with a secret can redeem this type of HTLC. By modifying the script, the HTLC can be implemented in different forms. For example, adding a CHECKSIG operator and a public key in the first clause to restrict the conversion of the hash value to a specified recipient. This recipient must know the secret.

After Alice executes the HTLC lock transaction TX1 in the ETH blockchain network 310, the transaction TX1 is published in the ETH blockchain network 310 and the first HTLC (HTLC1) is waiting for a proof Information of the transaction TX1 can be published (or open) and can be accessed in the ETH blockchain network 310, for example, by network nodes or participant systems, or other authorized users or clients in the ETH blockchain network 310. In some embodiments, the transaction information can include, for example, a sender address (e.g., Alice's ETH account address), a receiver address (e.g., the first HTLC address in the ETH blockchain network 310), a transferred value (e.g., 30 ETHs), a transaction commit time (e.g., when TX1 is executed), a secret hash (e.g., H), and/or an expiration time. The expiration time can be counted from the transaction commit time of TX1.

At 333, Alice transmits the secret hash H to Bob. At 334, Bob uses the received secret hash H to create a second HTLC in the BTC blockchain network 320 corresponding to the first HTLC created by Alice, for example, by invoking the second HTLC smart contract deployed in the BTC blockchain network 320. Bob can initiate a transaction TX2 according to the second HTLC. In some embodiments, Bob can set the received secret hash H as the hash lock of the second HTLC, set another expiration time t2 as the time lock, and store a corresponding number of BTCs, e.g., 3 BTCs, in the corresponding account address of the second HTLC smart contract in the BTC blockchain network 320. In some embodiments, the second HTLC can be also encrypted such that the second HTLC can be opened only with Alice's signature. The second HTLC can be configured such that the transaction TX2 will be abandoned and the transferred value in TX2 will be refunded to Bob's BTC account if Alice does not provide the proof and optionally Alice's signature within the expiration time t2.

In some embodiments, the expiration time t2 can be, for example, as a default or a configurable time period. In some embodiments, the expiration time t2 can correspond to a number of blocks to be generated by the BTC blockchain network 320, or based on another event or time unit. The expiration time t2 can be shorter than the expiration time t1 such that Alice can retrieve the number of BTCs from the second HTLC address in the BTC blockchain network 320 before Bob can retrieve the number of ETHs from the first HTLC address in the ETH blockchain network 310. In some examples, the expiration time t1 is longer than a sum of the expiration time t2 and a time threshold. In some embodiments, the time threshold can be determined at least partially based on a difference between a network time of the ETH blockchain network 310 and a network time of the BTC blockchain network 320.

In some embodiments, the transferred value in TX1 (e.g., 30 ETHs) stored in the ETH HTLC and the transferred value in TX2 (e.g., 3 BTCs) stored in the BTC HTLC can be predetermined or negotiated by Alice and Bob. Alice and Bob may determine the exchange rate (or ratio) based on an exchange ratio between ETH currency and BTC currency in the ETH blockchain network 310 and the BTC blockchain network 320. In some embodiments, the exchange ratio can be an exchange ratio before Alice starts trading with Bob, that is, before the transaction commit time of TX1. In some embodiments, the exchange ratio can be another ratio agreed by the two parties (e.g., at another time instance or based on another criteria).

After Bob executes the HTLC lock transaction TX2 in the BTC blockchain network 320, the transaction TX2 is published in the BTC blockchain network 320 and the second HTLC is waiting for a proof. Information of the transaction TX2 can be published (or open) and can be accessed in the BTC blockchain network 320. In some embodiments, the information can include, for example, a sender address (e.g., Bob's BTC account address), a receiver address (e.g., the second HTLC address in the BTC blockchain network 320), a transferred value (e.g., 3 BTCs), a transaction commit time (e.g., when TX2 is executed), a secret hash (e.g., H), and/or an expiration time (e.g., tx2). The expiration time can be counted from the transaction commit time of TX2.

At step 335, Alice initiates a transaction TX3 by providing the secret as the proof to execute the second HTLC. The secret is revealed in the BTC blockchain network 320. Once the condition of the second HTLC is satisfied (e.g., the hash lock is unlocked by the secret), the second HTLC is executed and Alice receives the transferred value in TX2, e.g., 3 BTCs, stored in the second HTLC at step 336.

Information of the transaction TX3 can be published (or open) and can be accessed in the BTC blockchain network 320. In some embodiments, the information can include, for example, a sender address (e.g., Alice's ETH account address), a receiver address (e.g., the second HTLC address in BTC blockchain network 320), a transaction commit time (e.g., when TX3 is executed), and/or a proof (e.g., the secret). In some embodiments, the information can also include a transferred value (e.g., the received value 3 BTCs from the second HTLC address).

As the secret is revealed in the BTC blockchain network 320, Bob knows the secret and initiates a transaction TX4 by providing the secret as the proof to execute the first HTLC in the ETH blockchain network 310 at step 337. Once the condition of the first HTLC is satisfied (e.g., the hash lock is unlocked by the secret), the first HTLC is executed and Bob receives the transferred value in TX1, e.g., 30 ETHs, stored in the first HTLC at step 338.

Information of the transaction TX4 can be published (or open) and can be accessed in the ETH blockchain network 310. The information can include, for example, a sender address (e.g., Bob's BTC account address), a receiver address (e.g., the first HTLC address in the ETH blockchain network 310), a transaction commit time (e.g., when TX4 is executed), and/or a proof (e.g., the secret). In some embodiments, the information can also include a transferred value (e.g., the received value 30 ETHs from the first HTLC address).

The transfer between Alice and Bob is completed without a third party endorsement. There is also no need for mutual trust between Alice and Bob to perform the process 330. If Alice cannot execute the second HTLC within the expiration time tx2, Bob can get the transferred value in TX2 refunded. If Bob cannot execute the first HTLC within the expiration time tx1, Alice can get the transferred value in TX1 refunded.

FIG. 4 shows a graph 400 illustrating known information and hidden information related to the cross-chain transaction of FIG. 3 in accordance with embodiments of this specification. The example of the cross-chain transaction of FIG. 3 is the asset exchange between Alice and Bob across the ETH blockchain network 310 and BTC blockchain network 320. As described with respect to FIG. 3, the cross-chain transaction is related to the four transactions TX1, TX2, TX3, and TX4 in FIG. 3. The transactions TX1 and TX4 are associated with the first HTLC in the ETH blockchain network 310. The transactions TX2 and TX3 are associated with the second HTLC in the BTC blockchain network 320. As the BTC blockchain network 320 is different and can be independently operated from the ETH blockchain network 310, it may be challenging to identify the relationship between these transactions.

Implementations of the specification provide techniques for identifying the relationship between these transactions and further identifying the cross-chain transaction between Alice and Bob, as well as deriving hidden information of the cross-chain transaction, for example, based on accessible information of published transactions in the two different blockchain networks and characteristics of HTLC protocols. For example, according to the HTLC protocols, two parties conducting cross-chain transactions according to the HTLC protocols can access HTLC data, such as a secret or a proof of locked assets. The described techniques can identify the related published transactions and their underlying related cross-chain transaction, for example, based on the HTLC data and characteristics of HTLC protocols such as a time difference between the expiration time (or a timeout period) of the hash lock and the time when one party can withdraw its own assets so that the party can withdraw in time when the other party cheats unilaterally. Additionally, for an HTLC, regardless of the success of the atomic swap, there can be 2 to 4 transactions published in the blockchain networks related to the HTLC or the atomic swap.

After a transaction is executed in a blockchain network, information of the transaction is published in the blockchain network and becomes available, which can be accessed and known by users of the blockchain network. As an example illustrated in FIG. 4, the information of TX1 can include a sender address (e.g., Alice's ETH account address), a receiver address (e.g., the first HTLC address in the ETH blockchain network 310), a transferred value (e.g., 30 ETHs), a transaction commit time (e.g., when TX1 is executed), a secret hash (e.g., H), and/or an expiration time, e.g., t1. The information of TX2 can include a sender address (e.g., Bob's BTC account address), a receiver address (e.g., the second HTLC address in the BTC blockchain network 320), a transferred value (e.g., 3 BTCs), a transaction commit time (e.g., when TX2 is executed), a secret hash (e.g., H), and/or an expiration time (e.g., tx2). The information of TX3 can include a sender address (e.g., Alice's ETH account address), a receiver address (e.g., the second HTLC address in BTC blockchain network 320), a transaction commit time (e.g., when TX3 is executed), a proof (e.g., the secret), and/or a transferred value (e.g., the received value 3 BTCs from the second HTLC address). The information of TX4 can include a sender address (e.g., Bob's BTC account address), a receiver address (e.g., the first HTLC address in the ETH blockchain network 310), a transaction commit time (e.g., when TX4 is executed), a proof (e.g., the secret), and/or a transferred value (e.g., the received value 30 ETHs from the first HTLC address).

The accessible information of the published transactions can be used to identify the relationship of the transactions, e.g., by mining or otherwise retrieving, searching, and analyzing blockchain data in the blockchain networks according to a number of criteria. The related transactions can be identified if they meet one or more of the criteria.

For example, for TX1 and TX2, the transaction commit time of TX2 is later than the transaction commit time of TX1, and the secret hash in TX2 is the same as the secret hash of TX1 according to the HTLC protocol. Additionally, according to the HTLC protocol, the expiration time t1 of TX1 is longer than a sum of the expiration time t2 of TX2 and a time threshold that is at least partially based on a network time difference between the ETH and BTC blockchain networks, such that TX3 is executed earlier than TX4. Also, as atomic swap is for an equivalent exchange, the ratio between the transferred value in TX1 (e.g., 30 ETHs) and the transferred value in TX2 (e.g., 3 BTCs) is related to an exchange rate (e.g., an exchange rate between the currencies of ETH and BTC). In some embodiments, Alice and Bob may negotiate the exchange before TX1 is executed, and the ratio can be, for example, an official or public exchange rate before TX1 is executed that can be looked up or determined when identifying the related transactions. In some embodiments, a ratio range can be used to filter or otherwise identify transactions with a ratio between transferred values fall into the ratio range. In some embodiments, the ratio range can depend on a variation of the exchange rate between the currencies of the transferred values (e.g., ETH and BTC).

For TX2 and TX3, the transaction commit time of TX3 is later than the transaction commit time of TX2. As TX2 and TX3 are associated with the same second HTLC, the receiver address of TX2 is the same as the receiver address of TX3, that is, the second HTLC address in the BTC blockchain network. Also, Alice uses the secret as the proof to execute the second HTLC, thus, the hash of the proof in TX3 is identical to the secret hash in TX2. Also, as Alice receives the transferred value of TX2, e.g., 3 BTCs, from the second HTLC address, the transferred value in TX3 is identical to the transferred value of TX2.

For TX3 and TX4, the transaction commit time of TX4 is later than the transaction commit time of TX3. As Bob uses the secret revealed in the BTC blockchain network as the proof to execute the first HTLC in the ETH blockchain network, the proof in TX4 is the same as the proof of TX3 when Alice uses the secret as the proof to execute the second HTLC in the BTC blockchain network.

For TX4 and TX1, the transaction commit time of TX4 is later than the transaction commit time of TX1. As TX1 and TX4 are associated with the same second HTLC, the receiver address of TX4 is the same as the receiver address of TX1, that is, the first HTLC address in the ETH blockchain network. Also, Bob uses the secret as the proof to execute the first HTLC, thus, the hash of the proof in TX4 is identical to the secret hash in TX1. Also, as Bob receives the transferred value of TX1, e.g., 30 ETHs, from the first HTLC address, the transferred value in TX4 is identical to the transferred value of TX1.

The graph 400 can be used to present the relationships or associations between the transactions TX1, TX2, TX3, and TX4. In some embodiments, the graph can be rendered on a graphic user interface to visually show the relationships or associations between the transactions, for example, represented by solid connection lines as illustrated in FIG. 4. In some embodiments, the graph can be used to identify the cross-chain transaction that is related to the four HTLC transactions TX1, TX2, TX3, and TX4. Hidden information of the cross-chain transaction, can be further derived or determined, and illustrated on the graph 400, for example, represented by dash lines in FIG. 4. The hidden information can include, for example, who are the two parties of the cross-chain transaction, e.g., Alice and Bob and what are their account addresses in ETH and BTC, e.g., Alice's ETH account address is the sender address of TX1 and Alice's BTC account address is the sender address of TX3; Bob's ETH account address is the sender address of TX4 and Bob's BTC account address is the sender address of TX2. The hidden information also includes an exchange (or swap) of the cross-chain transaction that is an exchange between the transferred value in TX1 and the transferred value in TX2 and an exchange ratio that is the ratio between the transferred value in TX1 and the transferred value in TX2. The hidden information can include additional or different parameters or attributes of the cross-chain transaction.

In some examples, an entity (e.g., participant A, participant B, or participant C of FIG. 2) or a user (e.g., a user of the ETH and BTC blockchain networks) can use a computing system to access published transactions in the blockchain networks and to execute an algorithm for identifying transactions that are associated with each other and related a same cross-chain transaction across the blockchain networks. One example implementation of the algorithm for identifying relevant transactions in Blockchain 1 and Blockchain 2 can be expressed as follows:

```
find relevant_transactions (Blockchain 1, Blockchain 2):
result = []
for each tx1 in Blockchain 1:
    if tx1 not an HTLC transaction: # tx1 call address != HTLC address
        continue # next tx1 loop back
    #for each tx2 in Blockchain 2:
        if tx2 not an HTLC transaction:
            continue
        if tx2.commit_time <= tx1.commit_time:
            continue
        if tx1.time_lock <= tx2.time_lock:
            continue
        # if tx1.value != tx2.value * ratio:
        # continue
        if tx1.H != tx2.H:
            continue
        # now found matched transaction pair <tx1, tx2>
        for each tx3 in Blockchain 2:
            if tx3 not an HTLC transaction:
                continue
            if tx3.commit_time <= tx2.commit_time:
                continue
            if tx3.receiver != tx2.receiver:
                continue
            if Hash(tx3.proof) != tx2.H:
                continue
            # now found matched transaction sequence <tx1, tx2, tx3>
            for each tx4 in Blockchain 1:
                if tx4 not an HTLC transaction:
                    continue
                if tx4.commit_time <= tx3.commit_time:
                    continue
                if tx3.proof != tx4.proof
                    continue
                if tx4.receiver != tx1.receiver:
                    continue
                # found matched transaction sequence
                seq= (TX1, TX2, TX3, TX4)
                result.append(seq)
return result.
```

The algorithm can determine whether a transaction in a blockchain network is an HTLC transaction. In some embodiments, whether a transaction is an HTLC transaction can be determined based on whether a call address of the transaction is the same as a smart contract address of the HTLC smart contract deployed in the blockchain network. For example, the above algorithm can traverse through every published transaction (tx1) in the Blockchain 1 to search for a TX1 that is related to an cross-chain transaction, and determine that a transaction tx1 is not an HTLC transaction if tx1's call address is not equal to (!=) an HTLC smart contract address. In some embodiments, determining whether a transaction is an HTLC transaction can include determining whether the transaction is executed according to an HTLC protocol. For example, the algorithm can determine whether TX1 or TX2 is an HTLC transaction by determining whether the transaction information includes a secret hash as the hash lock and an expiration time as the time lock for the hash lock. The algorithm can determine whether TX3 or TX4 includes an HTLC address and/or a proof for calculating a hash of the proof to be compared with a secret hash in the HTLC.

In some embodiments, additional or different operations can be included in the algorithm for identifying relevant transactions in multiple blockchain networks. For example, some of the operations shown in the find_relevant_transactions ( ) can be performed in different order, in parallel, or based on different inputs. In some embodiments, some of the operations can be omitted, optimized or otherwise modified, for example, to improve the execution efficiency for identifying relevant transactions in multiple blockchain networks. For example, the time lock determination (e.g., tx1.time_lock<=tx2.time_lock) and transferred value comparison (e.g., tx1.value!=tx2.value*ratio) can be optional. In some embodiments, rather than a ratio, a ratio range (e.g., [ratio_min, ratio_max]) may be specified. Then the determination can be based on Tx1.value*ratio_min<=Tx2.value<=Tx1.value*ratio_max.

As another example, an algorithm can identify the cross-chain transaction by: 1) identifying that TX1 and TX4 are associated with each other and related to the first HTLC in the first blockchain network, and that TX2 and TX3 are associated with each other and related to the second HTLC in the second blockchain network; and 2) then identifying that TX1 and TX2 are associated and that TX3 and TX4 are associated.

In some embodiments, the algorithm can use a function such as analyze_sequence(TX1, TX2, TX3, TX4) as shown below to derive the hidden information of the cross-chain transaction:

```
analyze_sequence(TX1,TX2, TX3, TX4):
    userA = [TX1.sender, TX3.sender]
    userB = [TX4.sender, TX2.sender]
```

-continued

```
swap = (TX1.value, TX2.value)
ratio = TX2.value/TX1.value
return (userA, userB, swap, ratio).
```

The above example function can derive the hidden information such as the parties (e.g., userA and userB) of the cross-chain transaction, the swap value, and an exchange ratio of the of the cross-chain transaction. In some embodiments, the hidden information can include other parameters. In some embodiments, other functions can be used to derive the hidden information of the cross-chain transaction based on the identified published transactions TX1, TX2, TX3, and TX4 in the blockchain networks.

In some embodiments, the above techniques and algorithms can be applied or extended to identify multiple cross-chain transactions between more than two parties and/or more than two blockchain networks. In some embodiments, the multiple blockchain networks are different blockchain network instances based on the same or different blockchain platforms. Each blockchain network can support a respective type of assets or values (e.g., a respective currency or cryptocurrency). For example, one or more of the multiple blockchain networks can support ETH, some of the multiple blockchain networks can support BTC, while one or more of the other multiple blockchain networks can support another cryptocurrency. For illustration purposes, FIGS. 5 and 6 are described with respect to two cross-chain transactions between three parties across two different blockchain networks.

FIG. 5 is a diagram illustrating an example 500 of multiple cross-chain transactions between three parties 502, 504, 506 (e.g., Alicen, Bob, and Cathy) across multiple blockchain networks 510 and 520 (e.g., ETH and BTC blockchain networks) in accordance with embodiments of this specification. The ETH blockchain network 510 and BTC blockchain network 520 can be the ETH blockchain network 310 and the BTC blockchain network 320, respectively. Each blockchain network can have a different corresponding currency or cryptocurrency, e.g., ETH for the blockchain network 510 and BTC for the blockchain network 520.

In some embodiments, there can be two HTLC swaps or cross-chain transactions. In the first cross-chain transaction, Alice and Bob exchange a certain amount of ETH and BTC currencies, e.g., 30 ETHs to 3 BTCs. The first cross-chain transaction can be related to transactions AB1, AB2, AB3, AB4 as illustrated in FIG. 5. In the second cross-chain transaction, Bob and Cathy exchange a certain amount of ETH and BTC currencies, e.g., 30 ETHs to 3 BTCs. The second cross-chain transaction can be related to transactions BC1, BC2, BC3, BC4 as illustrated in FIG. 5. In some embodiments, the multiple cross-chain transactions can use the same or different hash functions. In some embodiments, one or more middlemen can be used to bridge two or more cross-chain transactions.

As an example, the HTLC swaps use the same hash function, e.g., SHA256. Bob can serve as a middleman in the trading between Alice and Cathy, e.g., exchanging 30 ETHs of Alice with 3 BTCs of Cathy. Bob does not earn an intermediate value difference. For example, Alice and Bob only have a number of ETHs but have no or little BTCs, while Cathy has a number of BTCs. Bob can first get 3 BTCs that Alice wants from Cathy with his own 30 ETHs and then exchange the obtained 3 BTCs with Alice's 30 ETHs. FIG.

5 illustrates a process 530 of an example process for performing the cross-chain transactions between Alice and Cathy through Bob.

As an example, Alice can first use her client device, e.g., through a participant system, to create a secret (secret1) and then calculate a hash of the secret based on a hash function at step 351, where H1=hash (secret1). The hash function can be selected by Alice and can be, for example, SHA256. The secret and the hash of the secret can be used to create a hash lock of an HTLC.

Then, at step 532, Alice can use the client device to execute a transaction AB1 in the ETH blockchain network 510. In the AB1, Alice can invoke a first HTLC smart contract (HTLC1) using the account address of the first HTLC smart contract in the ETH blockchain network 510 to initialize parameters of the first HTLC smart contract. For example, the secret hash H1 can be set as a hash lock to be an output of the first HTLC. A condition can be configured for the first HTLC where one knowing the secret can use the secret as a proof to obtain the H1 value in the first HTLC to obtain the to-be-transferred value from Alice. For example, Alice sets the to-be-transferred value is 30 ETHs, and sends 30 ETHs to the account address of the first HTLC smart contract. Alice can also set an expiration time t1 as a time lock in the first HTLC. In some embodiments, to enable that only an authorized or designated entity, e.g., Bob, can retrieve the transferred value using the secret, Alice can create an encrypted digital lockbox that can be opened only by the secret and the designated entity's unique key (e.g., a signature or other unique identifier).

After Alice executes the HTLC locked transaction AB1 in the ETH blockchain network 510, the transaction AB1 is published in the ETH blockchain network 510 and the first HTLC (HTLC1) is waiting for a proof. At 533, Alice transmits the secret hash H1 to Bob.

At 534, Bob can use his client device to create a second secret (secret2) and calculate a hash of the second secret based on a hash function, H2=hash (secret2). The hash function can be the same as the hash function used at 531. At 535, Bob can use the client device to execute a transaction BC1 in the ETH blockchain network 510. In the BC1, Bob can invoke a second HTLC (HTLC2) at a second HTLC address in the ETH blockchain network 510 to initialize parameters of the second HTLC smart contract, e.g., setting the secret hash H2 as a hash lock, an expiration time t2 as a time lock in the second HTLC, and a transferred value, e.g., 30 ETHs, at the second HTLC address in the ETH blockchain network 510. A condition can be configured for the second HTLC where one knowing the secret can use the secret as a proof to obtain the H2 value in the second HTLC to obtain the to-be-transferred value from Bob. For example, Bob sets the to-be-transferred value is 30 ETHs, and sends 30 ETHs to the account address of the second HTLC smart contract. In some embodiments, the second HTLC can be encrypted such that the second HTLC can be opened only with Cathy's signature. After Bob executes the HTLC locked transaction BC1 in the ETH blockchain network 510, the transaction BC1 can be published in the ETH blockchain network 510 and the second HTLC (HTLC2) is waiting for a proof. At 536, Bobs transmits the secret hash H2 to Cathy.

At 537, Cathy then uses the received secret hash H2 to create a corresponding third HTLC (HTLC3) in the BTC blockchain network 520 and executes a transaction BC2 according to the third HTLC. Cathy can set the received secret hash H2 as the hash lock of the third HTLC, set another expiration time t3 as the time lock, and store a corresponding number of BTCs, e.g., 3 BTCs, in the corresponding third HTLC address in the BTC blockchain network 520. A condition can be configured for the third HTLC where one knowing the secret can use the secret as a proof to obtain the H2 value in the third HTLC to obtain the to-be-transferred value from Cathy. For example, Cathy sets the to-be-transferred value is 3 BTCs, and sends 3 BTCs to the account address of the third HTLC smart contract. In some embodiments, the third HTLC can be also encrypted such that the third HTLC can be opened only with Bob's signature. The expiration time t3 can be shorter than the expiration time t2 such that Bob can retrieve the number of BTCs from the third HTLC address in the BTC blockchain network 520 before Cathy can retrieve the number of ETHs from the second HTLC address in the ETH blockchain network 510. After Cathy executes the HTLC locked transaction BC2 in the BTC blockchain network 520, the transaction BC2 is published in the BTC blockchain network 520 and the third HTLC (HTLC3) is waiting for a proof.

At 538, Bob initiates a transaction BC3 by providing the secret2 as the proof to execute the third HTLC (HTLC3). The secret2 is revealed in the BTC blockchain network 520. Once a condition of the third HTLC is satisfied (e.g., the hash lock is unlocked by the secret2 and optionally Bob's signature), the third HTLC (HTLC3) is executed and Bob receives the transferred value in BC2, e.g., 3 BTCs, stored in the third HTLC at step 539.

As the secret2 is revealed in the BTC blockchain network 520, Cathy knows the secret2 and executes a transaction BC4 by providing the secret2 as the proof to execute the second HTLC (HTLC2) in the ETH blockchain network 510 at step 540. Once the condition of the second HTLC is satisfied (e.g., the hash lock is unlocked by the secret2 and optionally Cathy's signature), the second HTLC is executed and Cathy receives the transferred value in BC1, e.g., 30 ETHs, stored in the second HTLC at 541. Thus, the HTLC swap between Bob and Cathy is completed with Bob getting 3 BTCs from Cathy and Cathy getting 30 ETHs from Bob.

After getting 3 BTCs from Cathy, at 542, Bob can use the received secret hash H1 from Alice to invoke a fourth HTLC smart contract (HTLC4) corresponding to the first HTLC in the BTC blockchain network 520 and execute a transaction AB2 according to the fourth HTLC. Bob can set the received secret hash H1 as the hash lock of the fourth HTLC, set another expiration time t4 as the time lock, and store a corresponding number of BTCs, e.g., 3 BTCs, in the account address of the fourth HTLC smart contract in the BTC blockchain network 520. A condition can be configured for the fourth HTLC where one knowing the secret can use the secret as a proof to obtain the H1 value in the fourth HTLC to obtain the to-be-transferred value from Bob. For example, Bob sets the to-be-transferred value is 3 BTCs, and sends 3 BTCs to the account address of the fourth HTLC smart contract. In some embodiments, the fourth HTLC can be also encrypted such that the fourth HTLC can be opened only with Alice's signature. The expiration time t4 can be shorter than the expiration time t1 such that Alice can retrieve the number of BTCs from the fourth HTLC address in the BTC blockchain network 520 before Bob can retrieve the number of ETHs from the first HTLC address in the ETH blockchain network 510. After Bob executes the HTLC locked transaction AB2 in the BTC blockchain network 520, the transaction AB2 is published in the BTC blockchain network 520 and the fourth HTLC (HTLC4) is waiting for a proof.

At 543, Alice initiates a transaction AB3 by providing the secret1 as the proof to execute the fourth HTLC (HTLC4). The secret1 is revealed in the BTC blockchain network 520.

Once the condition of the fourth HTLC is satisfied (e.g., the hash lock is unlocked by the secret1 and optionally Alice's signature), the fourth HTLC (HTLC4) is executed and Alice receives the transferred value in AB2, e.g., 3 BTCs, stored in the fourth HTLC address at step 544.

As the secret1 is revealed in the BTC blockchain network 520, Bob knows the secret1 and initiates a transaction AB4 by providing the secret1 as the proof to execute the first HTLC (HTLC1) in the ETH blockchain network 510 at step 545. Once the condition of the first HTLC is satisfied (e.g., the hash lock is unlocked by the secret1 and optionally Bob's signature), the first HTLC is executed and Bob receives the transferred value in AB1, e.g., 30 ETHs, stored in the first HTLC at step 546. Thus, the HTLC swap between Alice and Bob is completed with Alice getting 3 BTCs from Bob and Bob getting 30 ETHs from Alice. In these two HTLC swaps (or cross-chain transactions), Bob acts as a middleman for Alice and Cathy for exchanging 30 ETHs with 3 BTCs.

FIG. 6 shows a graph 600 illustrating hidden information and known information in the multiple cross-chain transactions of FIG. 5 in accordance with embodiments of this specification. An entity (e.g., participant A, participant B, or participant C of FIG. 2) or a user (e.g., a user of the ETH and BTC blockchain networks) can use a computing system to access the ETH and BTC blockchain networks and to identify the cross-chain transactions across the ETH and BTC blockchain networks based on published HTLC transactions in the blockchain networks and further to derive the hidden information between the cross-chain transactions based on the known information of the cross-chain transactions and/or associated HTLC transactions. For example, the entity can be a financial institution who performs KYC operations. The computing system can implement an algorithm that can encompass the algorithms find_relevant_transactions( ) and analyze_sequence( ) described above with respect to FIG. 4 or variations thereof.

After the two HTLC swaps between Alice, Bob, and Cathy described in FIG. 5, there are 8 HTLC transactions published in the ETH and BTC blockchain networks, among which AB1, AB4, BC1 and BC4 are published in the ETH blockchain network and AB2, AB3, BC2, and BC3 are published in the BTC blockchain network. Information of the transactions can be accessed by users of the ETH and BTC blockchain networks.

As illustrated in FIG. 6, the information of AB1 can include a sender address (e.g., Alice's ETH account address), a receiver address (e.g., the first HTLC address in the ETH blockchain network 510), a transferred value (e.g., 30 ETHs), a transaction commit time (e.g., when AB1 is executed), a secret hash (e.g., H1), and/or an expiration time, e.g., t1. The information of AB2 can include a sender address (e.g., Bob's BTC account address), a receiver address (e.g., the fourth HTLC address in the BTC blockchain network 520), a transferred value (e.g., 3 BTCs), a transaction commit time (e.g., when AB2 is executed), a secret hash (e.g., H1), and/or an expiration time (e.g., tx4). The information of AB3 can include a sender address (e.g., Alice's ETH account address), a receiver address (e.g., the fourth HTLC address in BTC blockchain network 520), a transaction commit time (e.g., when AB3 is executed), a proof (e.g., the secret1), and/or a transferred value (e.g., the received value 3 BTCs from the fourth HTLC address). The information of AB4 can include a sender address (e.g., Bob's BTC account address), a receiver address (e.g., the first HTLC address in the ETH blockchain network 510), a transaction commit time (e.g., when AB4 is executed), a proof (e.g., the secret1), and/or a transferred value (e.g., the received value 30 ETHs from the first HTLC address). The transaction commit times of AB1, AB2, AB3, and AB4 can be sequentially ordered in time.

As illustrated in FIG. 6, the information of BC1 can include a sender address (e.g., Bob's ETH account address), a receiver address (e.g., the second HTLC address in the ETH blockchain network 510), a transferred value (e.g., 30 ETHs), a transaction commit time (e.g., when BC1 is executed), a secret hash (e.g., H2), and/or an expiration time, e.g., t2. The information of BC2 can include a sender address (e.g., Cathy's BTC account address), a receiver address (e.g., the third HTLC address in the BTC blockchain network 520), a transferred value (e.g., 3 BTCs), a transaction commit time (e.g., when BC2 is executed), a secret hash (e.g., H2), and/or an expiration time (e.g., tx2). The information of BC3 can include a sender address (e.g., Bob's ETH account address), a receiver address (e.g., the third HTLC address in BTC blockchain network 520), a transaction commit time (e.g., when BC3 is executed), a proof (e.g., the secret2), and/or a transferred value (e.g., the received value 3 BTCs from the third HTLC address). The information of BC4 can include a sender address (e.g., Cathy's BTC account address), a receiver address (e.g., the second HTLC address in the ETH blockchain network 510), a transaction commit time (e.g., when BC4 is executed), a proof (e.g., the secret2), and/or a transferred value (e.g., the received value 30 ETHs from the second HTLC address). The transaction commit times of BC1, BC2, BC3, and BC4 can be sequentially ordered in time. Moreover, the transaction commit times of AB1, BC1, BC2, BC3, BC4, AB2, AB3, and AB4 can be sequentially ordered in time, as illustrated in FIG. 5.

The accessible information of the published transactions can be used to identify the relationship of the transactions, e.g., by mining or otherwise retrieving, searching, and analyzing blockchain data in the blockchain networks according to a number of criteria, similar to what is described in FIG. 4 with respect to the transactions TX1, TX2, TX3, TX4. The related transactions can be identified if they meet one or more of the criteria. For example, AB1, AB2, AB3, and AB4 can be identified to be related to a first cross-chain transaction, and BC1, BC2, BC3, and BC4 can be identified to be related to a second cross-chain transaction.

The graph 600 can be used to present the relationships or associations between the transactions AB1, AB2, AB3, and AB4 and associations between the transactions BC1, BC2, BC3, and BC4. In some embodiments, the graph can be rendered on a graphic user interface to visually show the relationships or associations between the transactions, for example, by solid connection lines as illustrated in FIG. 6. In some embodiments, the graph 600 can be used to identify the first cross-chain transaction that is related to the four HTLC transactions AB1, AB2, AB3, and AB4, and the second cross-chain transaction that is related to the four HTLC transactions BC1, BC2, BC3, and BC4.

Hidden information of the first cross-chain transaction can be further derived or determined based on known information for the four HTLC transactions AB1, AB2, AB3, and AB4, and illustrated on the graph 600, for example, represented by dash lines in FIG. 6. The hidden information can include who are the two parties of the cross-chain transaction, e.g., Alice and Bob, and what are their account addresses in ETH and BTC, e.g., Alice's ETH account address is the sender address of AB1 and Alice's BTC account address is the sender address of AB3; Bob's ETH account address is the sender address of AB4 and Bob's BTC account address is the sender address of AB2. The hidden information can also include an exchange (or swap) of the cross-chain transaction that is an exchange between the transferred value in AB1, e.g., 30 ETHs, and the transferred value in AB2, e.g., 3 BTCs, and an exchange ratio that is the ratio between the transferred value in AB1 and the transferred value in AB2.

Similarly, hidden information of the second cross-chain transaction can be further derived or determined based on known information for the four HTLC transactions BC1, BC2, BC3, and BC4, and illustrated on the graph 600, for example, represented by dash lines in FIG. 6. The hidden information can include who are the two parties of the cross-chain transaction, e.g., Bob and Cathy, and what are their account addresses in ETH and BTC, e.g., Bob's ETH account address is the sender address of BC1 and Bob's BTC account address is the sender address of BC3; Cathy's ETH account address is the sender address of BC4 and Cathy's BTC account address is the sender address of BC2. The hidden information can also include an exchange (or swap) of the cross-chain transaction that is an exchange between the transferred value in BC1, e.g., 30 ETHs, and the transferred value in BC2, e.g., 3 BTCs, and an exchange ratio that is the ratio between the transferred value in BC1 and the transferred value in BC2.

In some examples, a user (or a party) has only a unique account in a blockchain network. The computing system can compare the hidden information of the first cross-chain transaction and the hidden information of the second cross-chain transaction to determine that the sender address of AB4 is the same as the sender address of BC1, both of which are Bob's ETH account address, and that the sender address of AB2 is the same as the sender address of BC3, both of which are Bob's BTC account address. Thus, it can be determined that Bob is involved in the first cross-chain transaction with Alice and the second cross-chain transaction with Cathy.

Additionally, in some embodiments, the computing system can compare the known information of the first cross-chain transaction (e.g., the information of AB1, AB2, AB3, and AB4) and the known information of the second cross-chain transaction (e.g., the information of BC1, BC2, BC3, and BC4). The computing system can determine that, based on, a result of the comparison, the transferred values of AB1, AB4, BC1, and BC4 are identical to each other, e.g., 30 ETHs, and the transferred values of AB2, AB3, BC2, and BC3 are identical to each other, e.g., 3 BTCs. Thus, the computing system can determine that Bob is a middleman for Alice and Cathy in the two cross-chain transactions. That is, Alice exchanges 30 ETHs for 3 BTCs from Cathy through Bob, and Bob earns no intermediate value difference from the exchange.

In some embodiments, if Bob earns an intermediate value difference from the exchange, e.g., a portion of the exchange such as 10%, the computing system can determine whether a ratio difference between a ratio of the transferred values of BC1 and AB1 and 1 is smaller than a predetermined ratio, e.g., 20%. If the ratio difference is smaller than the predetermined ratio, the computing system can still determine that Bob is a middleman who helps exchange between Alice and Cathy and earns an exchange difference.

Figure 7A:
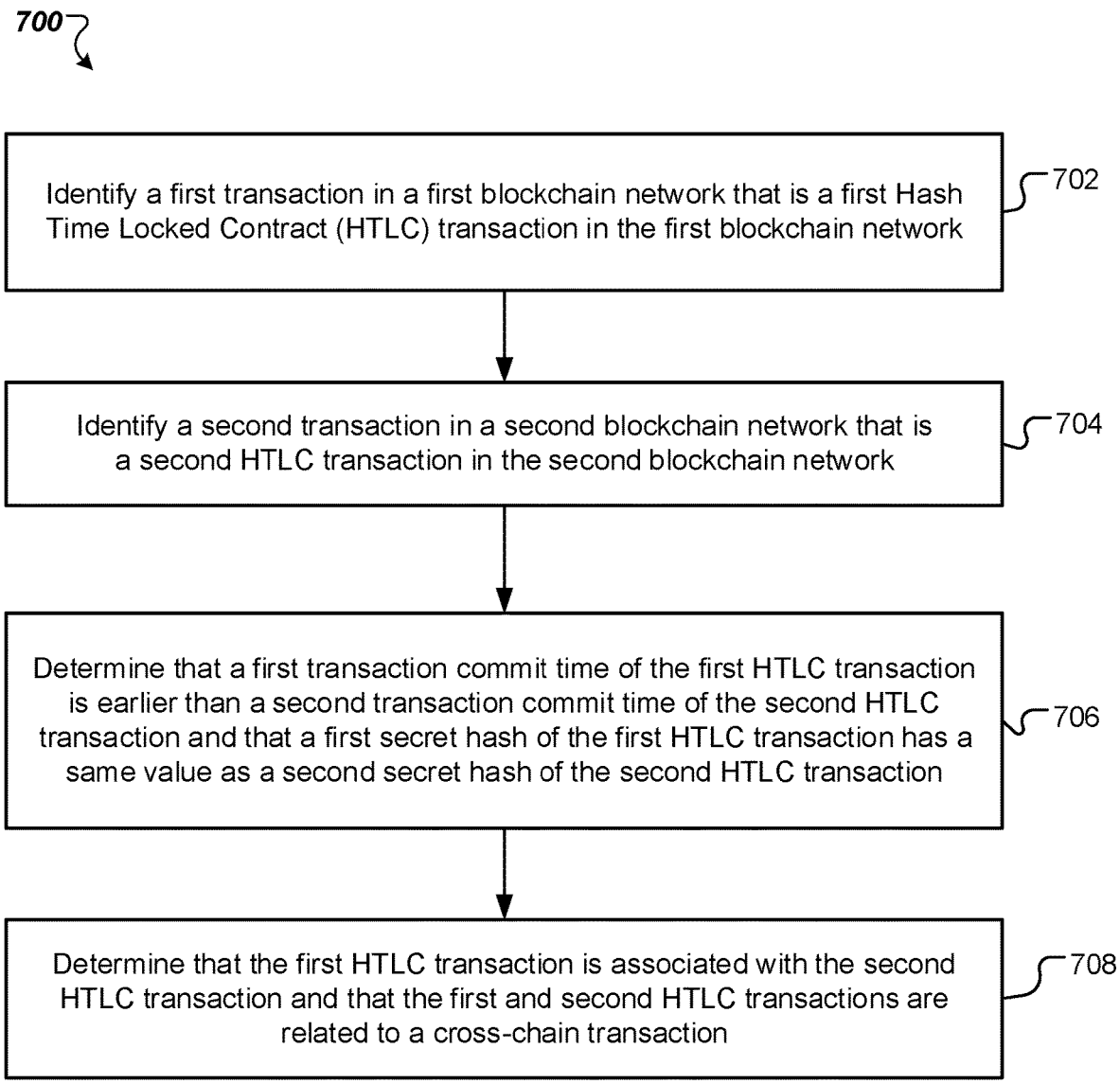
FIG. 7A is a flowchart illustrating an example of a process that can be executed by a computing system in accordance with embodiments of this specification.
Figure 7B:
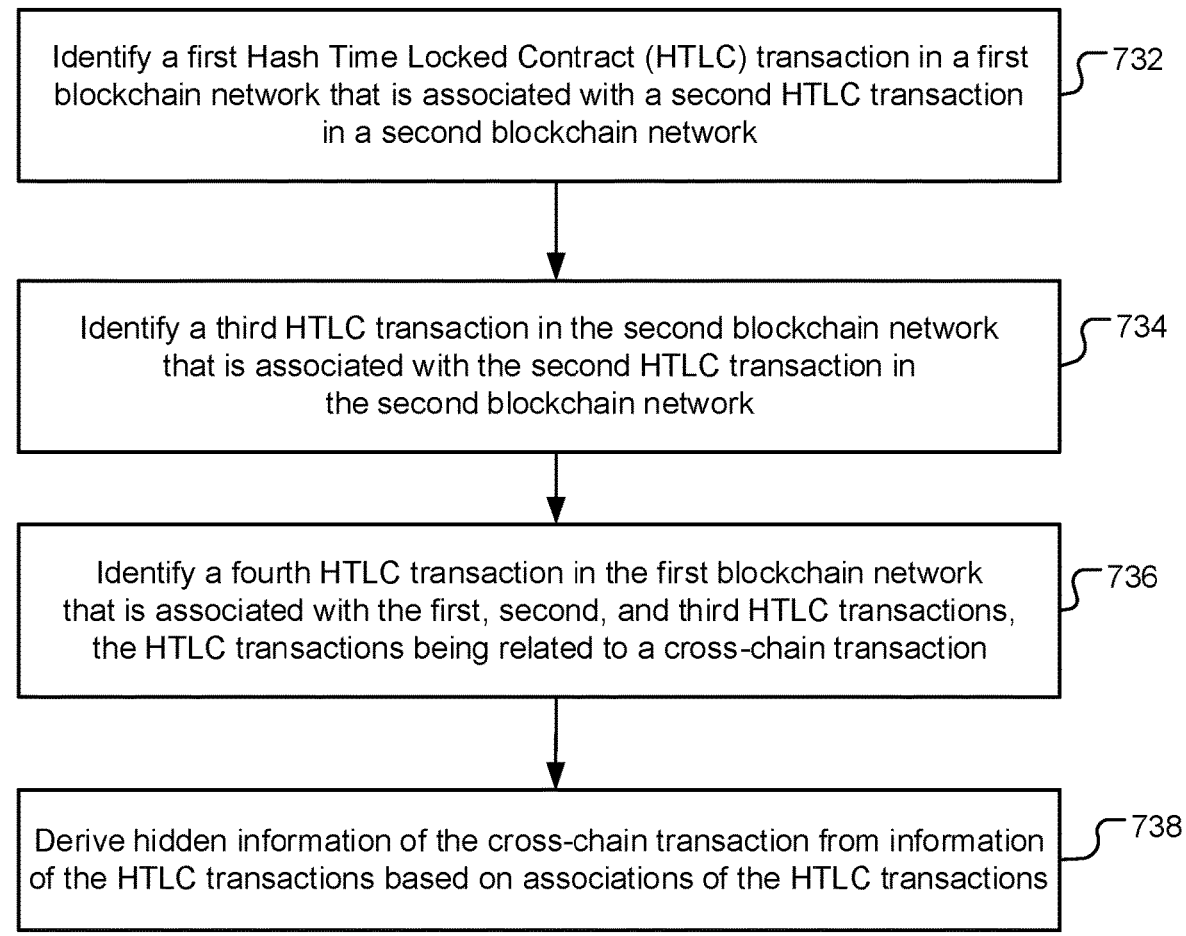
FIG. 7B is a flowchart illustrating an example of another process that can be executed by a computing system in accordance with embodiments of this specification.
Figure 7C:
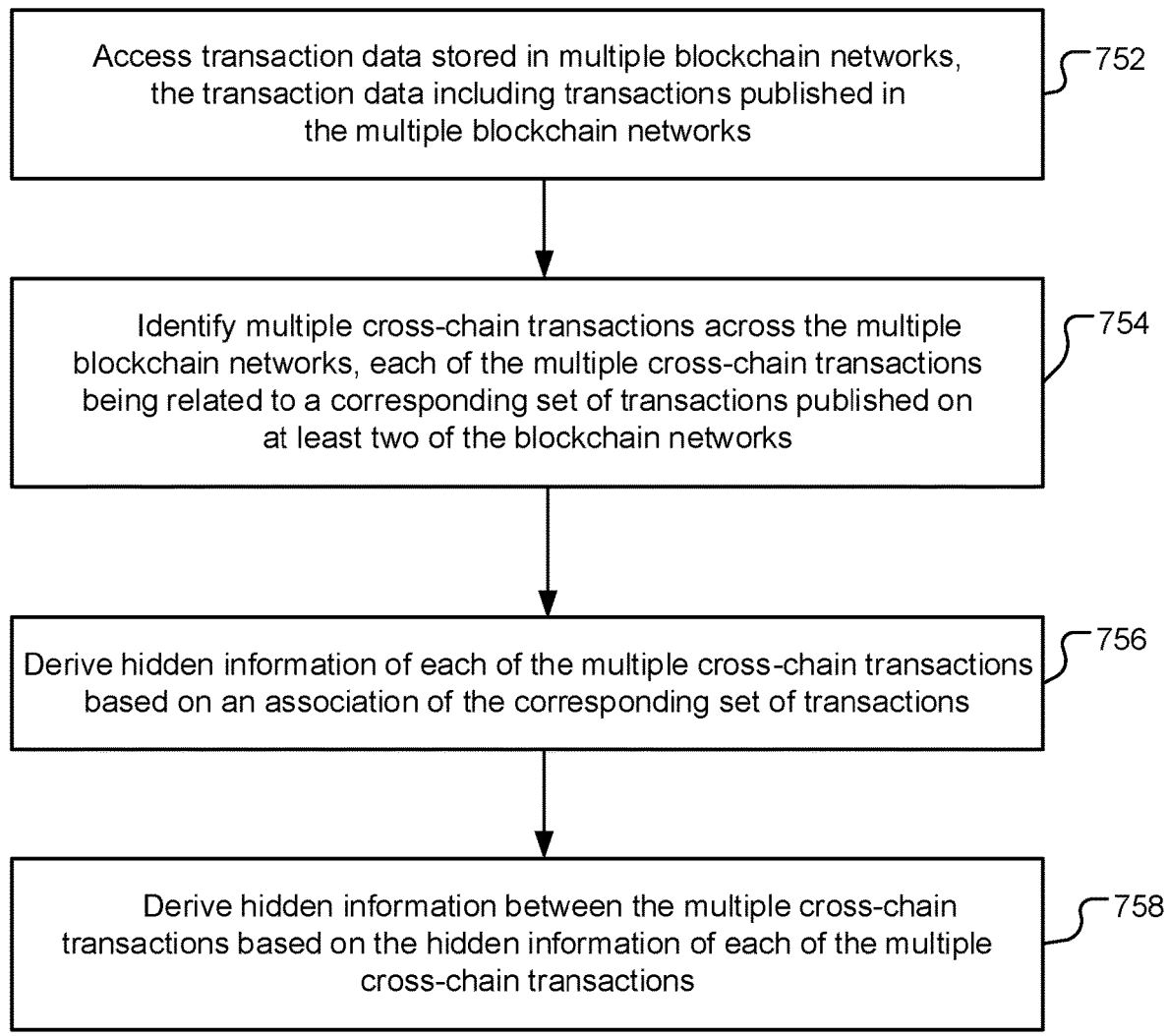
FIG. 7C is a flowchart illustrating an example of a further process that can be executed by a computing system in accordance with embodiments of this specification.

FIGS. 7A, 7B, 7C are flowcharts illustrating examples of processes for managing transactions in multiple blockchain networks that can be executed by a computing system in accordance with embodiments of this specification. For convenience, the computing system includes one or more computers, located in one or more locations, and programmed appropriately in accordance with this specification. The computing system can be associated with an entity, e.g., a financial institution such as a bank, or a user of the multiple blockchain networks.

Each of the blockchain networks can be a blockchain-based ledger system, such as a consortium blockchain network 102 of FIG. 1 or 212 of FIG. 2, the ETH blockchain network 310 of FIG. 3 or 510 of FIG. 5, the BTC blockchain network 320 of FIG. 3 or 520 of FIG. 5, a private blockchain network, a public blockchain network, a side-chain (or child-chain) network, or any other blockchain network that supports smart contracts (e.g., HTLC smart contracts) and access of transaction data, where the blockchain networks can be any suitable combination thereof. Each of the blockchain networks can be different from each other. Each of the blockchain networks can be associated with a respective unit or measure of assets (e.g., a respective currency).

Referring to FIG. 7A, a process 700 for managing transactions in multiple blockchain networks is performed by the computing system. In some embodiments, the process 700 includes reading, retrieving, receiving, or otherwise accessing transaction data stored in the multiple blockchain networks. The transaction data includes transactions published in the multiple blockchain networks.

The computing system can execute an algorithm to perform data mining or other analyses on the transaction data to identify associated transactions in the multiple blockchain networks to further identify a cross-chain transaction related to the associated transactions and derive hidden information of the cross-chain transaction. In some embodiments, the algorithm can encompass the algorithms find_relevant_transactions( ) and analyze_sequence( ) described above with respect to FIG. 4 or variations thereof.

At 702, a first transaction in a first blockchain network is identified to be a first Hash Time Locked Contract (HTLC) transaction in the first blockchain network. The first blockchain network can be, for example, the ETHEREUM (ETH) blockchain network 310 or the BITCOIN (BTC) blockchain network 320 of FIG. 3. The first HTLC transaction can be identified by searching among the published transactions stored in the first blockchain network.

In some embodiments, the computing system can find a transaction published in a blockchain network and determine whether the transaction is an HTLC transaction by determining whether the transaction is executed according to an HTLC protocol. In some embodiments, the computing system determines whether the transaction is executed according to an HTLC protocol by determining whether information of the transaction (or transaction data published in the blockchain network) includes a secret hash as a hash lock and an expiration time as a time lock for the hash lock, and/or whether the transaction is configured to be abandoned after the expiration time such that a transferred value in the transaction is refunded. In some embodiments, the computing system determines whether the transaction is executed according to an HTLC protocol by determining whether a receiver address of the transaction is an HTLC address (e.g., an account address of an HTLC smart contract) in the blockchain network, and/or whether a hash of a proof of the transaction is calculated and compared with a secret hash in the HTLC.

If the computing system determines that a transaction is not an HTLC transaction, the computing system can keep checking a next transaction in the blockchain network. In some embodiments, if the computing system determines that a transaction is an HTLC transaction and identify it as the first HTLC transaction, the computing system can proceed to identify a second transaction in another blockchain network that is associated with the first transaction. In some embodiments, the computing system may transverse all published transactions in the blockchain network to identify all HTLC transactions in the blockchain network. Additional or different operations can be performed.

As an example, the computing system can determine that the first transaction in the first blockchain network, e.g., TX1 in FIG. 3, is the first HTLC transaction in the first blockchain network by determining that the first transaction includes a first secret hash, e.g., H, and a first expiration time, e.g., t1.

At 704, a second transaction in a second blockchain network is identified to be a second HTLC transaction in the second blockchain network, for example, in a similar or different manner as described with respect to 702. As an example, the second blockchain network can be the BTC blockchain network 320 of FIG. 3. The computing system can determine that the second transaction in the second blockchain network, e.g., TX2 in FIG. 3, is the second HTLC transaction in the second blockchain network by determining that the second transaction includes a second secret hash, e.g., H, and a second expiration time, e.g., t2.

At 706, a first transaction commit time of the first HTLC transaction is determined to be earlier than a second transaction commit time of the second HTLC transaction and the first secret hash of the first HTLC transaction is determined to have a same value as the second secret hash of the second HTLC transaction. Once the first HTLC transaction and the second HTLC transaction have been identified, information related to a HTLC protocol such as the transaction commit time and secret hash can be read, retrieved, or otherwise identified based on the respective transaction data of the first HTLC transaction and the second HTLC transaction. If the first HTLC transaction and the second HTLC transaction are associated with and pursuant to the same HTLC protocol, the second HTLC transaction is executed later than the first HTLC transaction, and the second HTLC transaction uses the same hash as the first HTLC transaction as the hash lock.

At 708, in response to determining that the first transaction commit time is earlier than the second transaction commit time and the first secret hash has the same value as the second secret hash, the first HTLC transaction is determined to be associated with the second HTLC transaction. The first HTLC transaction and the second HTLC transaction can also be determined to be related to a cross-chain transaction or an HTLC swap.

In some embodiments, the computing system further determines whether the first expiration time in the first HTLC transaction is longer than a sum of the second expiration time in the second HTLC transaction and a time threshold. The determining that the first HTLC transaction is associated with the second HTLC transaction can also be based on determining that the first expiration time is longer than the sum of the second expiration time and the time threshold. In some embodiments, the time threshold can be determined at least partially based on a difference between a network time of the first blockchain network and a network time of the second blockchain network.

In some embodiments, the first expiration time, the second expiration time, and the time threshold can be configured such that a third HTLC transaction corresponding to the second HTLC transaction is executed in the second blockchain network before a fourth HTLC transaction corresponding to the first HTLC transaction is executed in the first blockchain network. The first HTLC transaction and the fourth HTLC transaction can be associated with a first HTLC in the first blockchain network, and the second HTLC transaction and the third HTLC transaction can be associated with a second HTLC in the second blockchain network. The first HTLC can be configured such that the first HTLC transaction is abandoned after the first expiration time such that a transferred value in the first HTLC transaction is refunded, and the second HTLC can be configured such that the second HTLC transaction is abandoned after the second expiration time such that a transferred value in the second HTLC transaction is refunded.

In some embodiments, the computing system further determines whether a ratio between a first transferred value in the first HTLC transaction and a second transferred value in the second HTLC transaction is within a ratio range. The determining that the first HTLC transaction in the first blockchain network is associated with the second HTLC transaction in the second blockchain network can also be based on determining that the ratio between the first transferred value and the second transferred value is within the ratio range. The first blockchain network is associated with a first currency and the second blockchain network is associated with a second currency, and the ratio range can be predetermined by a variation or change of a ratio between the first currency and the second currency. The variation of the ratio between the first currency and the second currency can be before the first transaction commit time of the first transaction in the first blockchain network. In some embodiments, the variation of the ratio can be looked up or otherwise determined based on public data or from a known authority.

In some embodiments, if one or more of the above-described conditions are not satisfied by the respective parameters of the first HTLC transaction identified in 702 and the second HTLC transaction identified in 704, the computer system can go back to 702 and/or 704 to find another first HTLC transaction and/or another second HTLC transaction that meet the conditions described in 706. If after traversing all the transactions stored in the two blockchain networks and not a pair of HTLC transactions meet the conditions described in 706, the computer system can determine that there is no associated first HTLC transaction and second HTLC transaction that are related to a same cross-chain transaction or HTLC swap. In this case, the process 700 can terminate.

In some embodiments, the process 700 further includes: identifying a third transaction, e.g., TX3 in FIG. 3, in the second blockchain network is a third HTLC transaction in the second blockchain network, and determining whether a third transaction commit time of the third HTLC transaction is later than the second transaction commit time of the second HTLC transaction, whether a third receiver address of the third HTLC transaction is same as a second receiver address of the second HTLC transaction, whether a hash of a proof in the third HTLC transaction has a same value as the second secret hash of the second HTLC transaction. In response to determining that the third transaction commit time is later than the second transaction commit time, the third receiver address is the same as the second receiver address, and the hash of the proof in the third HTLC transaction has the same value as the second secret hash of the second HTLC transaction, the computing system can determine that the third HTLC transaction is associated with the second HTLC transaction and also determine that the first, second, and third HTLC transactions are related to the cross-chain transaction.

In some embodiments, the process 700 further includes: identifying a fourth transaction, e.g., TX4 in FIG. 3, in the first blockchain network that is a fourth HTLC transaction in the first blockchain network and determining whether a fourth transaction commit time of the fourth HTLC transaction is later than the third transaction commit time of the third HTLC transaction, whether a fourth receiver address of the fourth HTLC transaction is same as a first receiver address of the first HTLC transaction, and whether a proof in the fourth HTLC transaction is same as the proof in the third HTLC transaction. In response to determining that the fourth transaction commit time is later than the third transaction commit time, the fourth receiver address is the same as the first receiver address, and the proof in the fourth HTLC transaction is the same as the proof in the third HTLC transaction, the computing system can determine that the fourth transaction is associated with the first transaction, the second transaction, and the third transaction and also determine that the first, second, third, and fourth transactions are related to the cross-chain transaction.

In some embodiments, the process 700 further includes deriving hidden information of the cross-chain transaction from information of the first, second, third, and fourth transactions based on associations of the first, second, third, and fourth transactions. The information of each of the first and second transactions includes at least one of a sender address, a receiver address, a transferred value, a transaction commit time, a secret hash, or an expiration time, and the information of each of the third and fourth transactions comprises at least one of a sender address, a receiver address, a transferred value, a transaction commit time, or a proof.

The hidden information of the cross-chain transaction can include at least one of: a first party that has at least one of a first sender address of the first transaction or a third sender address of the third transaction, a second party that has at least one of a second sender address of the second transaction or a fourth sender address of the fourth transaction, an exchange that is an exchange between a first transferred value, e.g., 30 ETHs, of the first transaction and a second transferred value, e.g., 3 BTCs, of the second transaction, or an exchange ratio that is a ratio between the first transferred value in the first transaction and the second transferred value in the second transaction.

In some embodiments, the computing system can store information of the transactions in the multiple blockchain networks in a data structure, e.g., a graph or a table, render the identified transactions in a visualization (e.g., a graph 400 as shown in FIG. 4). In some embodiments, the computing system can further annotate the identified association or relationship among the identified transactions, for example, by connecting or highlighting the identified association or relationship among the transactions. In some embodiments, the computing system can further determine at least one cross-chain transaction related to the transactions and hidden information of the at least one cross-chain transaction based on the data structure and/or visualization.

Referring to FIG. 7B, a process 730 for managing transactions in multiple blockchain networks is performed by the computing system. In some embodiments, the process 730 includes reading, retrieving, receiving, or otherwise accessing transaction data stored in the multiple blockchain networks. The transaction data includes transactions published in the multiple blockchain networks. The computing system can execute an algorithm to identify associated transactions in the multiple blockchain networks to further identify a cross-chain transaction related to the associated transactions and derive hidden information of the cross-chain transaction. In some embodiments, the algorithm can encompass the algorithms find_relevant_transactions( ) and analyze_sequence( ) described above with respect to FIG. 4 or variations thereof.

At 732, a first Hash Time Locked Contract (HTLC) transaction in a first blockchain network is identified to be associated with a second HTLC transaction in a second blockchain network. As an example, the first HTLC transaction can be TX1 in FIG. 3, and the second HTLC transaction can be TX2 in FIG. 3. The first blockchain network can be the ETH blockchain network 310 of FIG. 3, and the second blockchain network can be the BTC blockchain network 320. The step 732 of the process 730 can be implemented according to the process 700 of FIG. 7A or in another manner.

In some embodiments, identifying the first HTLC transaction in the first blockchain network to be associated with the second HTLC transaction in the second blockchain network can include: determining that a transaction commit time of the second HTLC transaction is later than a transaction commit time of the first HTLC transaction, and determining that a secret hash of the second HTLC transaction has a same value as a secret hash of the first HTLC transaction.

In some embodiments, identifying the first HTLC transaction in the first blockchain network to be associated with the second HTLC transaction in the second blockchain network can also include: determining that an expiration time of the first HTLC transaction is longer than a sum of an expiration time of the second HTLC transaction and a time threshold. The expiration time of the first HTLC transaction, the expiration time of the second HTLC transaction, and the time threshold can be configured such that a third HTLC transaction associated with the second HTLC transaction is executed in the second blockchain network before a fourth HTLC transaction associated with the first HTLC transaction is executed in the first blockchain network. The time threshold can be determined at least partially based on a difference between a network time of the first blockchain network and a network time of the second blockchain network.

In some embodiments, identifying the first HTLC transaction in the first blockchain network to be associated with the second HTLC transaction in the second blockchain network can also include: determining that a ratio between a transferred value of the first transaction and a transferred value of the second transaction is within a ratio range. The first blockchain network is associated with a first currency and the second blockchain network is associated with a second currency, and the ratio range can be predetermined by a variation of a ratio between the first currency and the second currency. The variation of the ratio between the first currency and the second currency can be before the transaction commit time of the first HTLC transaction in the first blockchain network.

At 734, a third HTLC transaction in the second blockchain network is identified to be associated with the second HTLC transaction in the second blockchain network. For example, the third HTLC transaction can be TX3 in FIG. 3. The computing system can identify the third HTLC transaction associated with the second HTLC transaction by determining that a transaction commit time of the third HTLC transaction is later than a transaction commit time of the second HTLC transaction, determining that a receiver address of the third HTLC transaction is same as a receiver address of the second HTLC transaction, and determining that a hash of a proof in the third HTLC transaction has a same value as a secret hash of the second HTLC transaction.

At 736, a fourth HTLC transaction in the first blockchain network is identified to be associated with the first, second, and third HTLC transactions. The first, second, third, and fourth HTLC transactions can be determined to be related to a same cross-chain transaction across the first blockchain network and the second blockchain network by the computing system. The fourth HTLC transaction can be TX4 in FIG. 3.

In some embodiments, the computing system identifies the fourth HTLC transaction associated with the first, second, and third HTLC transactions by determining that a transaction commit time of the fourth HTLC transaction is later than a transaction commit time of the third HTLC transaction, determining that a proof in the fourth HTLC transaction is identical to a proof of the third HTLC transaction, and determining that a receiver address of the fourth HTLC transaction is same as a receiver address of the first HTLC transaction. The first, second, third, and fourth HTLC transactions can be executed sequentially in time.

At 738, hidden information of the cross-chain transaction is derived from information of the first, second, third, and fourth HTLC transactions based on associations of the first, second, third, and fourth HTLC transactions.

In some embodiments, the information of each of the first and second HTLC transactions includes at least one of a sender address, a receiver address, a transferred value, a transaction commit time, a secret hash, or an expiration time. In some embodiments, the information of each of the third and fourth HTLC transactions includes at least one of a sender address, a receiver address, a transferred value, a transaction commit time, or a proof.

In some embodiments, the hidden information of the cross-chain transaction includes at least one of: a first party of the cross-chain transaction that has at least one of a sender address of the first HTLC transaction or a sender address of the third HTLC transaction, or a second party of the cross-chain transaction that has at least one of a sender address of the second HTLC transaction or a sender address of the fourth HTLC transaction. The hidden information can also include an exchange (or a swap) of the cross-chain transaction that is an exchange between a transferred value, e.g., 30 ETHs, in the first HTLC transaction and a transferred value, e.g., 3 BTCs, in the second HTLC transaction, and/or an exchange ratio between the transferred value in the first HTLC transaction and the transferred value in the second HTLC transaction.

In some embodiments, the computing system can determine whether a transaction published in a blockchain network is an HTLC transaction by determining whether the transaction is executed according to an HTLC protocol. In some embodiments, the computing system determines that the first HTLC transaction or the second HTLC transaction by determining that information (or transaction data) of a corresponding transaction includes a secret hash as a hash lock and an expiration time as a time lock for the hash lock. In some embodiments, the computing system determines that the third HTLC transaction or the fourth HTLC transaction by determining that a receiver address of a corresponding transaction is an HTLC address in the blockchain network and a hash of a proof of the transaction is calculated and compared with a secret hash in the HTLC.

In some embodiments, the computing system can store information of the transactions in the multiple blockchain networks in a data structure, e.g., a graph or a table, render the identified transactions in a visualization (e.g., a graph 400 as shown in FIG. 4). In some embodiments, the computing system can further annotate the identified association or relationship among the identified transactions, for example, by connecting or highlighting the identified association or relationship among the transactions. In some embodiments, the computing system can further determine at least one cross-chain transaction related to the transactions and hidden information of the at least one cross-chain transaction based on the data structure and/or visualization.

Referring to FIG. 7C, a process 750 for managing transactions in multiple blockchain networks is performed by the computing system. The computing system can execute an algorithm to identify associated transactions in the multiple blockchain networks to further identify multiple cross-chain transactions related to the associated transactions and derive hidden information between the cross-chain transactions. The algorithm can encompass the examples of the algorithm described above with respect to FIG. 6 or variations thereof. As an example, the multiple blockchain networks can include the ETH blockchain network 510 and the BTC blockchain network 520 of FIG. 5.

At 752, transaction data stored in the multiple blockchain networks is accessed. In some embodiments, accessing the transaction data includes reading, retrieving, receiving, or otherwise obtaining transaction data stored in the multiple blockchain networks. The transaction data includes transactions published in the multiple blockchain networks, e.g., AB1, AB2, AB3, AB4, BC1, BC2, BC3, and BC4 in FIGS. 5 and 6. The transaction data can be mined or otherwise analyzed to identify HTLC transactions.

In some embodiments, the computing system determines whether a published transaction is executed according to an HTLC protocol by determining whether transaction data of the transaction includes a secret hash as a hash lock and an expiration time as a time lock for the hash lock and whether the transaction is configured to be abandoned after the expiration time such that a transferred value in the transaction is refunded. In some embodiments, the computing system determines whether the transaction is executed according to an HTLC protocol by determining whether a receiver address of the transaction is an HTLC address in the blockchain network and whether a hash of a proof of the transaction is calculated and compared with a secret hash in the HTLC.

At 754, multiple cross-chain transactions across the multiple blockchain networks are identified based on the transactions published in the multiple blockchain networks. Each of the multiple cross-chain transactions is identified to be related to a corresponding set of transactions published on at least two of the blockchain networks. The corresponding set of transactions are associated with one another. The computing system can identify a cross-chain transaction across the multiple blockchain networks by performing the process 700 of FIG. 7A or 730 of FIG. 7B.

In some embodiments, a first cross-chain transaction across a first blockchain network (e.g., the ETH blockchain network 510 of FIG. 5) and a second blockchain network (e.g., the BTC blockchain network 520 of FIG. 5) of the blockchain networks is identified by identifying first, second, third, and fourth Hash Time Locked Contract (HTLC) transactions (e.g., AB1, AB2, AB3, and AB4 of FIG. 5) that are related to the first cross-chain transaction. The first and fourth HTLC transactions are in the first blockchain network of the blockchain networks, and the second and third HTLC transactions are in a second blockchain network of the blockchain networks. In some embodiments, a second cross-chain transaction across the first blockchain network and the second blockchain network is identified by identifying fifth, sixth, seventh, and eighth HTLC transactions (e.g., BC1, BC2, BC3, and BC4 of FIG. 5) that are related to the second cross-chain transaction. The fifth and eighth HTLC transactions are in the first blockchain network, and the sixth and seventh HTLC transactions are in the second blockchain network.

In some embodiments, the computing system identifies the first cross-chain transaction by identifying that the first HTLC transaction in the first blockchain network that is associated with the second HTLC transaction in the second blockchain network, the third HTLC transaction in the second blockchain network that is associated with the second HTLC transaction in the second blockchain network, and the fourth HTLC transaction in the first blockchain network that is associated with the first, second, and third HTLC transactions. The computing system can also identify the second cross-chain transaction by identifying the fifth HTLC transaction in the first blockchain network that is associated with the sixth HTLC transaction in the second blockchain network, the seventh HTLC transaction in the second blockchain network that is associated with the sixth HTLC transaction in the second blockchain network, and identifying the eighth HTLC transaction in the first blockchain network that is associated with the fifth, sixth, and seventh HTLC transactions.

In some embodiments, the first, second, third, and fourth HTLC transactions are executed sequentially in time, and the fifth, sixth, seventh, and eighth HTLC transactions are executed sequentially in time. In some embodiments, the first, fifth, sixth, seventh, eighth, second, third, and fourth HTLC transactions are executed sequentially in time.

At 756, hidden information of each of the multiple cross-chain transactions is derived based on an association of the corresponding set of transactions. In some embodiments, the computing system can derive first hidden information of the first cross-chain transaction from information of the first, second, third, and fourth HTLC transactions based on associations of the first, second, third, and fourth HTLC transactions and derive second hidden information from information of the fifth, sixth, seventh, and eighth HTLC transactions based on associations of the fifth, sixth, seventh, and eighth HTLC transactions.

In some embodiments, for each of the first, second, fifth and sixth HTLC transactions, the information includes at least one of a sender address, a receiver address, a transferred value, a transaction commit time, a secret hash, or an expiration time. For each of the third, fourth, seventh, and eighth HTLC transactions, the information includes at least one of a sender address, a receiver address, a transferred value, a transaction commit time, or a proof.

In some embodiments, the first hidden information of the first cross-chain transaction includes at least one of: a first party of the first cross-chain transaction that has at least one of a sender address of the first HTLC transaction or a sender address of the third HTLC transaction, or a second party of the first cross-chain transaction that has at least one of a sender address of the second HTLC transaction or a sender address of the fourth HTLC transaction. The first hidden information of the first cross-chain transaction can further include at least one of: an exchange (or a swap) of the first cross-chain transaction that is an exchange between a transferred value in the first HTLC transaction and a transferred value in the second HTLC transaction, or an exchange ratio of the first cross-chain transaction that is a ratio between the transferred value in the first HTLC transaction and the transferred value in the second HTLC transaction.

In some embodiments, the second hidden information of the second cross-chain transaction includes at least one of:

a third party of the second cross-chain transaction that has at least one of a sender address of the fifth HTLC transaction or a sender address of the seventh HTLC transaction, or a fourth party of the second cross-chain transaction that has at least one of a sender address of the sixth HTLC transaction or a sender address of the eighth HTLC transaction. The second hidden information of the second cross-chain transaction can further include at least one of: an exchange (or swap) of the second cross-chain transaction that is an exchange between a transferred value in the fifth HTLC transaction and a transferred value in the sixth HTLC transaction, or an exchange ratio of the second cross-chain transaction that is a ratio between the transferred value in the fifth HTLC transaction and the transferred value in the sixth HTLC transaction.

At 758, hidden information between the multiple cross-chain transactions is derived based on the hidden information of each of the multiple cross-chain transactions.

In some embodiments, the computing system derives hidden information between the first and second cross-chain transactions by comparing the first hidden information of the first cross-chain transaction associated with the first, second, third, and fourth HTLC transactions and the second hidden information of the second cross-chain transaction associated with the fifth, sixth, seventh, and eighth HTLC transactions. In response to determining that a sender address of the fourth HTLC transaction is same as a sender address of the fifth HTLC transaction in the first blockchain network and that a sender address of the second HTLC transaction is same as a sender address of the seventh HTLC transaction in the second blockchain network, the computing system can determine the third party to be the second party.

In some embodiments, the computing system derives the hidden information between the first and second cross-chain transactions further by comparing the information of the first, second, third, and fourth HTLC transactions and the information of the fifth, sixth, seventh, and eighth HTLC transactions. In response to determining that transferred values of the first, fourth, fifth, and eighth HTLC transactions are identical to each other and that transferred values of the second, third, sixth, and seventh HTLC transactions are identical to each other, the computing system can determine that the second party is a middleman for a trade between the first party and the fourth party and determine that the transferred value of the first HTLC transaction associated with the first party is traded with the transferred value of the sixth HTLC transaction associated with the fourth party.

In some embodiments, the computing system can store information of the transactions in the multiple blockchain networks in a data structure, e.g., a graph or a table, render the identified transactions in a visualization (e.g., a graph 600 as shown in FIG. 6). In some embodiments, the computing system can further annotate the identified association or relationship among the identified transactions, for example, by connecting or highlighting the identified association or relationship among the transactions. In some embodiments, the computing system can further determine one or more cross-chain transactions related to the transactions and hidden information of the one or more cross-chain transactions and/or hidden information among or between two or more cross-chain transactions based on the data structure and/or visualization.

Figure 8A:
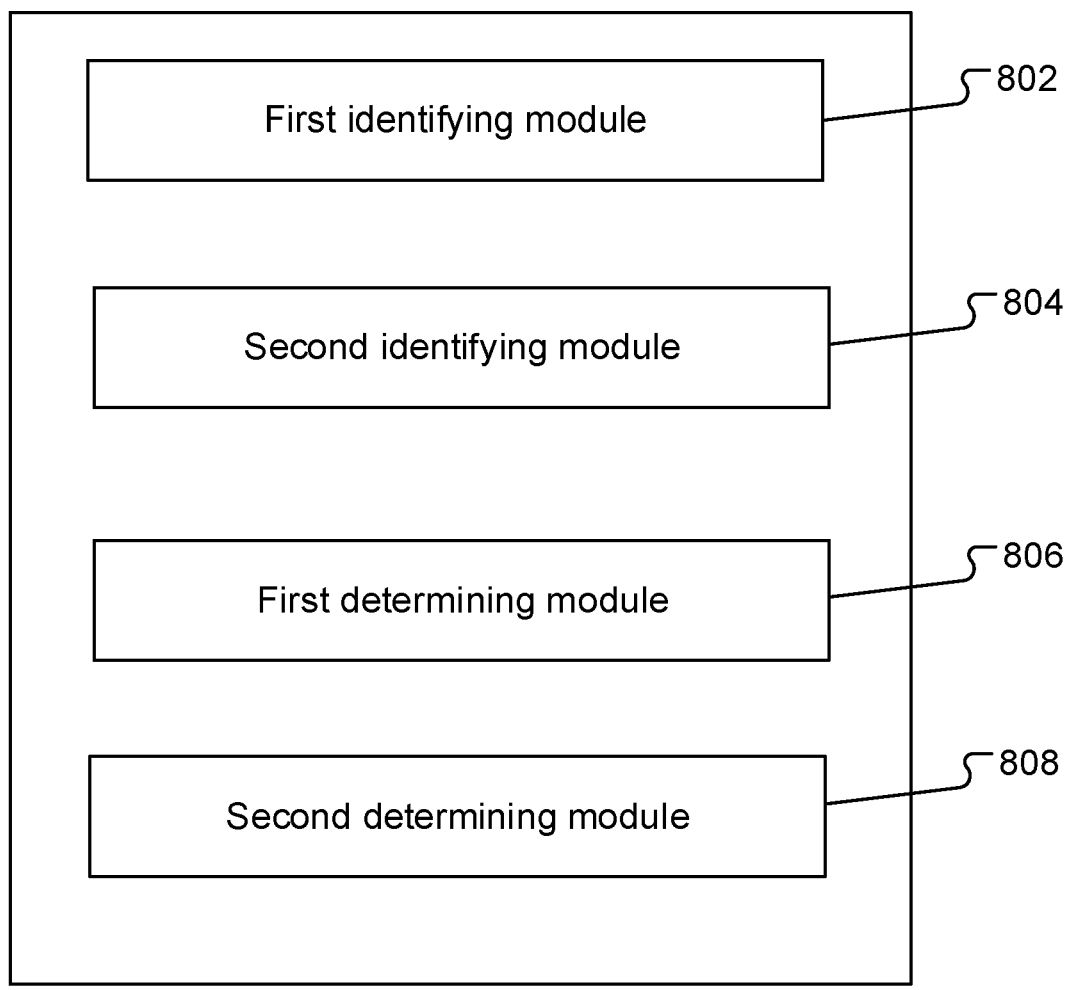
FIG. 8A depicts examples of modules of an apparatus in accordance with embodiments of this specification.

FIG. 8A depicts examples of modules of an apparatus 800 in accordance with embodiments of this specification. The apparatus 800 can be an example of an embodiment of a computing system configured to manage transaction in multiple blockchain networks. The apparatus 800 can correspond to the embodiments described above, and the apparatus 800 includes the following: a first identifying module 802 that identifies a first transaction in a first blockchain network that is a first Hash Time Locked Contract (HTLC) transaction in the first blockchain network; a second identifying module 804 that identifies a second transaction in a second blockchain network that is a second HTLC transaction in the second blockchain network, the second blockchain network being different from the first blockchain network; a first determining module 806 that determines that a first transaction commit time of the first HTLC transaction is earlier than a second transaction commit time of the second HTLC transaction and that a first secret hash of the first HTLC transaction has a same value as a second secret hash of the second HTLC transaction; and a second determining module 808 that determines, in response to determining that the first transaction commit time is earlier than the second transaction commit time and the first secret hash has the same value as the second secret hash, that the first HTLC transaction in the first blockchain network is associated with the second HTLC transaction in the second blockchain network and that the first HTLC transaction and the second HTLC transaction are related to a cross-chain transaction.

In some embodiments, the first determining module 806 is configured to further determine that a first expiration time in the first transaction is longer than a sum of a second expiration time in the second transaction and a time threshold, and the second determining module 808 determines that the first transaction in the first blockchain network is associated with the second transaction in the second blockchain network is in response to determining that the first expiration time is longer than the sum of the second expiration time and the time threshold.

In some embodiments, the time threshold is determined at least partially based on a difference between a network time of the first blockchain network and a network time of the second blockchain network.

In some embodiments, the first expiration time, the second expiration time, and the time threshold are configured such that a third HTLC transaction corresponding to the second HTLC transaction is executed in the second blockchain network before a fourth HTLC transaction corresponding to the first HTLC transaction is executed in the first blockchain network. The first HTLC transaction and the fourth HTLC transaction are associated with a first HTLC in the first blockchain network, and the second HTLC transaction and the third HTLC transaction are associated with a second HTLC in the second blockchain network.

In some embodiments, the first HTLC is configured such that the first HTLC transaction is abandoned after the first expiration time such that a transferred value in the first HTLC transaction is refunded, and the second HTLC is configured such that the second HTLC transaction is abandoned after the second expiration time such that a transferred value in the second HTLC transaction is refunded.

In some embodiments, the first determining module 806 is configured to further determine that a ratio between a first transferred value in the first transaction and a second transferred value in the second transaction is within a ratio range, and the second determining module 808 determines that the first transaction in the first blockchain network is associated with the second transaction in the second blockchain network is in response to determining that the ratio between the first transferred value and the second transferred value is within the ratio range.

In some embodiments, the first blockchain network is associated with a first currency and the second blockchain network is associated with a second currency, and the ratio range is predetermined by a variation of a ratio between the first currency and the second currency.

In some embodiments, the variation of the ratio between the first currency and the second currency is before the first transaction commit time of the first transaction in the first blockchain network.

In some embodiments, the apparatus 800 further includes a third identifying module that identifies a third transaction in the second blockchain network is a third HTLC transaction in the second blockchain network; a third determining module that determines a third transaction commit time of the third HTLC transaction is later than the second transaction commit time of the second HTLC transaction and that a third receiver address of the third HTLC transaction is same as a second receiver address of the second HTLC transaction and determines that a hash of a proof in the third HTLC transaction has a same value as the second secret hash of the second HTLC transaction; and a fourth determining module that determines, in response to determining that the third transaction commit time is later than the second transaction commit time, the third receiver address is the same as the second receiver address, and the hash of the proof in the third HTLC transaction has the same value as the second secret hash of the second HTLC transaction, that the third HTLC transaction is associated with the second HTLC transaction and that the first, second, and third HTLC transactions are related to the cross-chain transaction.

In some embodiments, the apparatus 800 further includes a fourth identifying module that identifies a fourth transaction in the first blockchain network that is a fourth HTLC transaction in the first blockchain network; a fifth determining module that determines that a fourth transaction commit time of the fourth HTLC transaction is later than the third transaction commit time of the third HTLC transaction, that a fourth receiver address of the fourth HTLC transaction is same as a first receiver address of the first HTLC transaction, and that a proof in the fourth HTLC transaction is same as the proof in the third HTLC transaction; and a sixth determining module that determines, in response to determining that the fourth transaction commit time is later than the third transaction commit time, the fourth receiver address is the same as the first receiver address, and the proof in the fourth HTLC transaction is the same as the proof in the third HTLC transaction, that the fourth transaction is associated with the first transaction, the second transaction, and the third transaction and that the first, second, third, and fourth transactions are related to the cross-chain transaction.

In some embodiments, the apparatus 800 further includes a deriving module that derives hidden information of the cross-chain transaction from information of the first, second, third, and fourth transactions based on associations of the first, second, third, and fourth transactions.

In some embodiments, the information of each of the first and second transactions comprises at least one of a sender address, a receiver address, a transferred value, a transaction commit time, a secret hash, or an expiration time, and the information of each of the third and fourth transactions comprises at least one of a sender address, a receiver address, a transferred value, a transaction commit time, or a proof.

In some embodiments, the hidden information of the cross-chain transaction comprises at least one of: a first party that has at least one of a first sender address of the first transaction or a third sender address of the third transaction, a second party that has at least one of a second sender address of the second transaction or a fourth sender address of the fourth transaction, an exchange that is an exchange between a first transferred value of the first transaction and a second transferred value of the second transaction, or an exchange ratio that is a ratio between the first transferred value in the first transaction and the second transferred value in the second transaction.

In some embodiments, the apparatus 800 further includes a determining module that determines that a transaction is an HTLC transaction by determining that the transaction is executed according to an HTLC protocol.

In some embodiments, the determining module determines that the transaction is executed according to an HTLC protocol by determining that information of the transaction comprises a secret hash as a hash lock and an expiration time as a time lock, the transaction being configured to be abandoned after the expiration time such that a transferred value in the transaction is refunded.

In some embodiments, the apparatus 800 includes a rendering module that renders information of the HTLC transactions in the multiple blockchain networks in a visualization on a user interface and annotating the associations of the HTLC transactions in the visualization.

In some embodiments, each of the multiple blockchain networks is associated with a different corresponding currency.

Figure 8B:
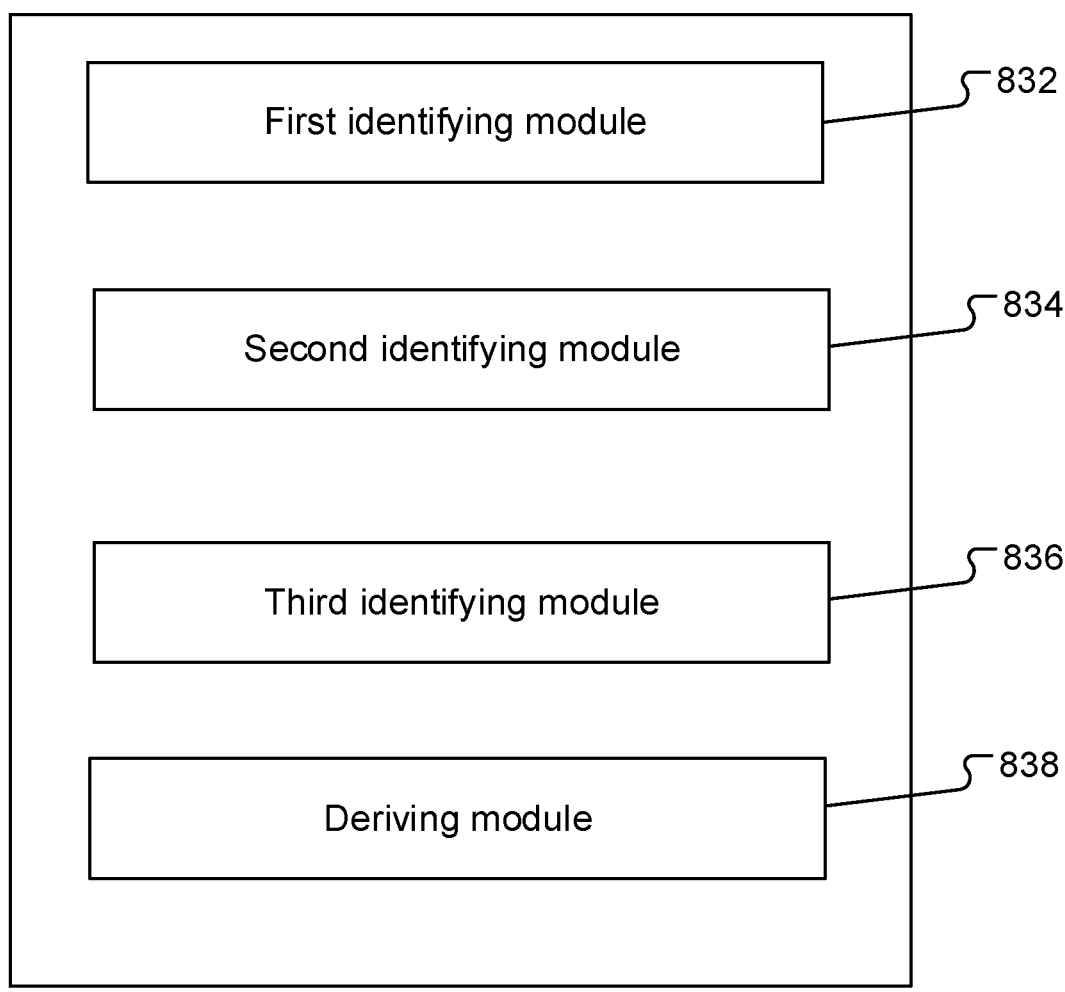
FIG. 8B depicts examples of modules of another apparatus in accordance with embodiments of this specification.

FIG. 8B depicts examples of modules of another apparatus 830 in accordance with embodiments of this specification. The apparatus 830 can be an example of an embodiment of a computing system configured to manage transactions in multiple blockchain networks. The apparatus 830 can correspond to the embodiments described above, and the apparatus 830 includes the following: a first identifying module 832 that identifies a first Hash Time Locked Contract (HTLC) transaction in a first blockchain network that is associated with a second HTLC transaction in a second blockchain network different from the first blockchain network; a second identifying module 834 that identifies a third HTLC transaction in the second blockchain network that is associated with the second HTLC transaction in the second blockchain network; a third identifying module 836 that identifies a fourth HTLC transaction in the first blockchain network that is associated with the first, second, and third HTLC transactions, the first, second, third, and fourth HTLC transactions being related to a cross-chain transaction across the first blockchain network and the second blockchain network; and a deriving module 838 that derives hidden information of the cross-chain transaction from information of the first, second, third, and fourth HTLC transactions based on associations of the first, second, third, and fourth HTLC transactions.

In some embodiments, the information of each of the first and second HTLC transactions includes at least one of a sender address, a receiver address, a transferred value, a transaction commit time, a secret hash, or an expiration time, and the information of each of the third and fourth HTLC transactions includes at least one of a sender address, a receiver address, a transferred value, a transaction commit time, or a proof.

In some embodiments, the hidden information of the cross-chain transaction includes at least one of: a first party of the cross-chain transaction, where deriving hidden information of the cross-chain transaction from information of the first, second, third, and fourth HTLC transactions includes determining the first party of the cross-chain transaction to have at least one of a sender address of the first HTLC transaction or a sender address of the third HTLC transaction, a second party of the cross-chain transaction, where deriving hidden information of the cross-chain transaction from information of the first, second, third, and fourth HTLC transactions includes determining the second party of the cross-chain transaction to have at least one of a sender address of the second HTLC transaction or a sender address of the fourth HTLC transaction, an exchange of the cross-chain transaction, where deriving hidden information of the cross-chain transaction from information of the first, second, third, and fourth HTLC transactions includes determining the exchange of the cross-chain transaction to be an exchange between a transferred value in the first HTLC transaction and a transferred value in the second HTLC transaction, or an exchange ratio between the transferred value in the first HTLC transaction and the transferred value in the second HTLC transaction.

In some embodiments, identifying the first HTLC transaction in the first blockchain network that is associated with the second HTLC transaction in the second blockchain network includes: determining that a transaction commit time of the second HTLC transaction is later than a transaction commit time of the first HTLC transaction, and determining that a secret hash of the second HTLC transaction has a same value as a secret hash of the first HTLC transaction.

In some embodiments, identifying the first HTLC transaction in the first blockchain network is associated with the second HTLC transaction in the second blockchain network further includes at least one of: determining that an expiration time of the first HTLC transaction is longer than a sum of an expiration time of the second HTLC transaction and a time threshold, or determining that a ratio between a transferred value of the first transaction and a transferred value of the second transaction is within a ratio range.

In some embodiments, the first blockchain network is associated with a first currency and the second blockchain network is associated with a second currency, and the ratio range is predetermined by a variation of a ratio between the first currency and the second currency.

In some embodiments, the variation of the ratio between the first currency and the second currency is before the transaction commit time of the first HTLC transaction in the first blockchain network.

In some embodiments, the expiration time of the first HTLC transaction, the expiration time of the second HTLC transaction, and the time threshold are configured such that the third HTLC transaction associated with the second HTLC transaction is executed in the second blockchain network before the fourth HTLC transaction associated with the first HTLC transaction is executed in the first blockchain network.

In some embodiments, the time threshold is determined at least partially based on a difference between a network time of the first blockchain network and a network time of the second blockchain network.

In some embodiments, identifying the third HTLC transaction in the second blockchain network that is associated with the second HTLC transaction in the second blockchain network includes: determining that a transaction commit time of the third HTLC transaction is later than a transaction commit time of the second HTLC transaction, determining that a receiver address of the third HTLC transaction is same as a receiver address of the second HTLC transaction, and determining that a hash of a proof in the third HTLC transaction has a same value as a secret hash of the second HTLC transaction.

In some embodiments, identifying a fourth HTLC transaction in the first blockchain network that is associated with the first, second, and third HTLC transactions includes: determining that a transaction commit time of the fourth HTLC transaction is later than a transaction commit time of the third HTLC transaction, determining that a proof in the fourth HTLC transaction is identical to a proof of the third HTLC transaction, and determining that a receiver address of the fourth HTLC transaction is same as a receiver address of the first HTLC transaction.

In some embodiments, the apparatus 832 includes a determining module that determines a transaction is an HTLC transaction by determining that the transaction is executed according to an HTLC protocol.

In some embodiments, determining that the transaction is executed according to the HTLC protocol includes: determining that information of the transaction comprises a secret hash as a hash lock and an expiration time as a time lock, the transaction being configured to be abandoned after the expiration time such that a transferred value in the transaction is refunded.

In some embodiments, the apparatus 830 includes a rendering module that renders information of the HTLC transactions in the multiple blockchain networks in a visualization on a user interface and annotating the associations of the HTLC transactions in the visualization.

In some embodiments, the first, second, third, and fourth HTLC transactions are executed sequentially in time.

In some embodiments, each of the multiple blockchain networks is associated with a different corresponding currency.

Figure 8C:
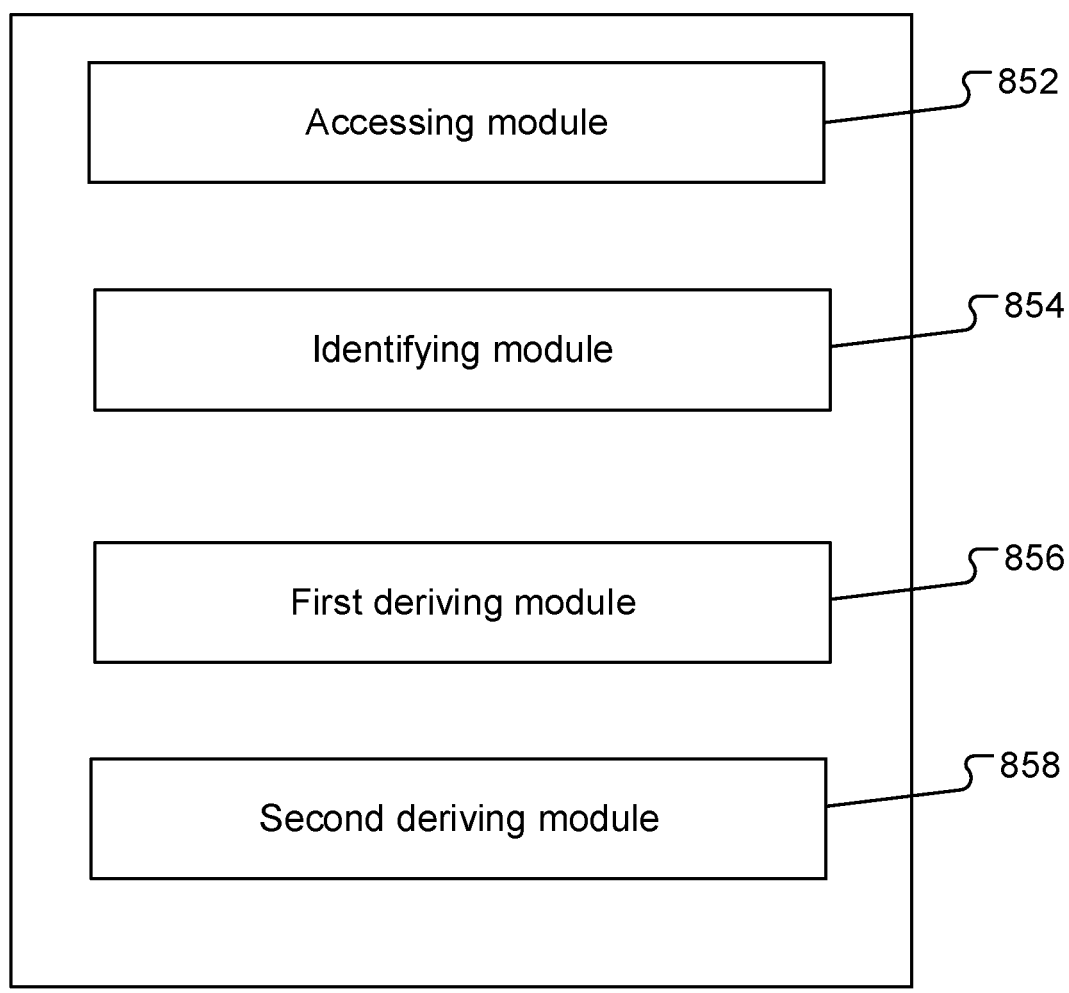
FIG. 8C depicts examples of modules of a further apparatus in accordance with embodiments of this specification.

FIG. 8C depicts examples of modules of another apparatus 850 in accordance with embodiments of this specification. The apparatus 850 can be an example of an embodiment of a computing system configured to manage transactions in multiple blockchain networks. The apparatus 850 can correspond to the embodiments described above, and the apparatus 850 includes the following: an accessing module 852 that accesses transaction data stored in the multiple blockchain networks, the transaction data including transactions published in the multiple blockchain networks, each of the multiple blockchain networks being different from each other; an identifying module 854 that identifies, based on the transactions published in the multiple blockchain networks, multiple cross-chain transactions across the multiple blockchain networks, each of the multiple cross-chain transactions being related to a corresponding set of transactions published on at least two of the blockchain networks, the corresponding set of transactions being associated with one another; a first deriving module 856 that derives hidden information of each of the multiple cross-chain transactions based on an association of the corresponding set of transactions; and a second deriving module that derives hidden information between the multiple cross-chain transactions based on the hidden information of each of the multiple cross-chain transactions.

In some embodiments, identifying the multiple cross-chain transactions includes: identifying a first cross-chain transaction across a first blockchain network and a second blockchain network of the blockchain networks by identifying first, second, third, and fourth Hash Time Locked Contract (HTLC) transactions that are related to the first cross-chain transaction, the first and fourth HTLC transactions being in a first blockchain network of the blockchain networks, the second and third HTLC transactions being in a second blockchain network of the blockchain networks, and identifying a second cross-chain transaction across the first blockchain network and the second blockchain network by identifying fifth, sixth, seventh, and eighth HTLC transactions that are related to the second cross-chain transaction, the fifth and eighth HTLC transactions being in the first blockchain network, the sixth and seventh HTLC transactions being in the second blockchain network.

In some embodiments, identifying the first cross-chain transaction across the first blockchain network and the second blockchain network includes: identifying the first HTLC transaction in the first blockchain network that is associated with the second HTLC transaction in the second blockchain network; identifying the third HTLC transaction in the second blockchain network that is associated with the second HTLC transaction in the second blockchain network; and identifying the fourth HTLC transaction in the first blockchain network that is associated with the first, second, and third HTLC transactions.

In some embodiments, identifying the second cross-chain transaction across the first blockchain network and the second blockchain network includes: identifying the fifth HTLC transaction in the first blockchain network that is associated with the sixth HTLC transaction in the second blockchain network; identifying the seventh HTLC transaction in the second blockchain network that is associated with the sixth HTLC transaction in the second blockchain network; and identifying the eighth HTLC transaction in the first blockchain network that is associated with the fifth, sixth, and seventh HTLC transactions.

In some embodiments, the first, second, third, and fourth HTLC transactions are executed sequentially in time, the fifth, sixth, seventh, and eighth HTLC transactions are executed sequentially in time, and the first, fifth, sixth, seventh, eighth, second, third, and fourth HTLC transactions are executed sequentially in time.

In some embodiments, deriving hidden information of each of the multiple cross-chain transactions based on an association of the corresponding set of transactions includes: deriving first hidden information of the first cross-chain transaction from information of the first, second, third, and fourth HTLC transactions based on associations of the first, second, third, and fourth HTLC transactions; and deriving second hidden information from information of the fifth, sixth, seventh, and eighth HTLC transactions based on associations of the fifth, sixth, seventh, and eighth HTLC transactions.

In some embodiments, the information of each of the first, second, fifth and sixth HTLC transactions includes at least one of a sender address, a receiver address, a transferred value, a transaction commit time, a secret hash, or an expiration time, and the information of each of the third, fourth, seventh, and eighth HTLC transactions comprises at least one of a sender address, a receiver address, a transferred value, a transaction commit time, or a proof.

In some embodiments, the first hidden information of the first cross-chain transaction includes at least one of: a first party of the first cross-chain transaction, where deriving first hidden information of the first cross-chain transaction from information of the first, second, third, and fourth HTLC transactions includes determining the first party of the first cross-chain transaction to have at least one of a sender address of the first HTLC transaction or a sender address of the third HTLC transaction, or a second party of the first cross-chain transaction, where deriving first hidden information of the cross-chain transaction from information of the first, second, third, and fourth HTLC transactions includes determining the second party of the cross-chain transaction to have at least one of a sender address of the second HTLC transaction or a sender address of the fourth HTLC transaction.

In some embodiments, the second hidden information of the second cross-chain transaction includes at least one of: a third party of the second cross-chain transaction, where deriving second hidden information from information of the fifth, sixth, seventh, and eighth HTLC transactions includes determining the third party of the third cross-chain transaction to have at least one of a sender address of the fifth HTLC transaction or a sender address of the seventh HTLC transaction, or a fourth party of the second cross-chain transaction, where deriving second hidden information from information of the fifth, sixth, seventh, and eighth HTLC transactions includes determining the fourth party of the cross-chain transaction to have at least one of a sender address of the sixth HTLC transaction or a sender address of the eighth HTLC transaction.

In some embodiments, the first hidden information of the first cross-chain transaction further includes at least one of: an exchange of the first cross-chain transaction, where deriving first hidden information of the first cross-chain transaction from information of the first, second, third, and fourth HTLC transactions includes determining the exchange of the first cross-chain transaction to be an exchange between a transferred value in the first HTLC transaction and a transferred value in the second HTLC transaction, or an exchange ratio of the first cross-chain transaction, where deriving first hidden information of the first cross-chain transaction from information of the first, second, third, and fourth HTLC transactions includes determining the exchange ratio of the first cross-chain transaction to be a ratio between the transferred value in the first HTLC transaction and the transferred value in the second HTLC transaction.

In some embodiments, the second hidden information of the second cross-chain transaction further includes at least one of: an exchange of the second cross-chain transaction, where deriving second hidden information of the second cross-chain transaction from information of the fifth, sixth, seventh, and eighth HTLC transactions includes determining the exchange of the second cross-chain transaction to be an exchange between a transferred value in the fifth HTLC transaction and a transferred value in the sixth HTLC transaction, or an exchange ratio of the second cross-chain transaction, where deriving second hidden information of the second cross-chain transaction from information of the fifth, sixth, seventh, and eighth HTLC transactions includes determining the exchange ratio of the second cross-chain transaction to be a ratio between the transferred value in the fifth HTLC transaction and the transferred value in the sixth HTLC transaction.

In some embodiments, deriving hidden information between the multiple cross-chain transactions based on the hidden information of each of the multiple cross-chain transactions includes: comparing the first hidden information of the first cross-chain transaction associated with the first, second, third, and fourth HTLC transactions and the second hidden information of the second cross-chain transaction associated with the fifth, sixth, seventh, and eighth HTLC transactions; determining that a sender address of the fourth HTLC transaction is same as a sender address of the fifth HTLC transaction in the first blockchain network and that a sender address of the second HTLC transaction is same as a sender address of the seventh HTLC transaction in the second blockchain network; and determining the third party to be the second party.

In some embodiments, deriving hidden information between the multiple cross-chain transactions based on the hidden information of each of the multiple cross-chain transactions further includes: comparing the information of the first, second, third, and fourth HTLC transactions and the information of the fifth, sixth, seventh, and eighth HTLC transactions; determining that transferred values of the first, fourth, fifth, and eighth HTLC transactions are identical to each other and that transferred values of the second, third, sixth, and seventh HTLC transactions are identical to each other; and determining that the second party is a middleman for a trade between the first party and the fourth party and that the transferred value of the first HTLC transaction associated with the first party is traded with the transferred value of the sixth HTLC transaction associated with the fourth party.

In some embodiments, each of the transactions corresponding to the multiple cross-chain transactions is a Hash Time Locked Contract (HTLC) transaction. The apparatus 850 includes a determining module that determines a transaction is an HTLC transaction by determining that the transaction is executed according to an HTLC protocol.

In some embodiments, determining that the transaction is executed according to the HTLC protocol includes: determining that information of the transaction comprises a secret hash as a hash lock and an expiration time as a time lock, the transaction being configured to be abandoned after the expiration time such that a transferred value in the transaction is refunded.

In some embodiments, the apparatus 850 includes a rendering module that renders information of the transactions published in the multiple blockchain networks in a visualization on a user interface and annotating the associations of the HTLC transactions in the visualization.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 8A, 8B, or 8C, it can be interpreted as illustrating internal functional modules and a structure of a computing implementation apparatus. The computing implementation apparatus can be an example of a computing system configured to manage transactions in multiple blockchain networks. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for managing transactions in multiple blockchain networks using one or more data mining algorithms, the computer-implemented method comprising:

accessing transaction data stored in the multiple blockchain networks, the transaction data comprising transactions published in the multiple blockchain networks, each of the multiple blockchain networks comprising a respective network of computing nodes that manage, update, and maintain one or more blockchains, the multiple blockchain networks comprising a first blockchain network and a second blockchain network that are different from each other;

determining, according to the one or more data mining algorithms, that a first Hash Time Locked Contract (HTLC) transaction published in the first blockchain network is associated with a second HTLC transaction published in the second blockchain network;

determining, according to the one or more data mining algorithms, that a third HTLC transaction published in the second blockchain network is associated with the second HTLC transaction published in the second blockchain network;

determining, according to the one or more data mining algorithms, that a fourth HTLC transaction published in the first blockchain network is associated with the first, second, and third HTLC transactions determining, according to the one or more data mining algorithms, that the first, second, third, and fourth HTLC transactions are related to a cross-chain transaction across the first blockchain network and the second blockchain network; and automatically deriving, according to the one or more data mining algorithms, hidden information of the cross-chain transaction from information of the first, second, third, and fourth HTLC transactions based on associations of the first, second, third, and fourth HTLC transactions, the hidden information of the cross-chain transaction comprising information of the first, second, third, and fourth HTLC transactions that is unpublished in the first blockchain network and the second blockchain network.

2. The computer-implemented method of claim 1, wherein the information of each of the first and second HTLC transactions comprises at least one of a sender address, a receiver address, a transferred value, a transaction commit time, a secret hash, or an expiration time, and wherein the information of each of the third and fourth HTLC transactions comprises at least one of a sender address, a receiver address, a transferred value, a transaction commit time, or a proof.

3. The computer-implemented method of claim 1, wherein the hidden information of the cross-chain transaction comprises at least one of:

a first party of the cross-chain transaction, wherein automatically deriving, according to the one or more data mining algorithms, the hidden information of the cross-chain transaction from information of the first, second, third, and fourth HTLC transactions comprises automatically determining, according to the one or more data mining algorithms, the first party of the cross-chain transaction to have at least one of a sender address of the first HTLC transaction or a sender address of the third HTLC transaction, a second party of the cross-chain transaction, wherein automatically deriving, according to the one or more data mining algorithms, the hidden information of the cross-chain transaction from information of the first, second, third, and fourth HTLC transactions comprises automatically determining, according to the one or more data mining algorithms, the second party of the cross-chain transaction to have at least one of a sender address of the second HTLC transaction or a sender address of the fourth HTLC transaction, an exchange of the cross-chain transaction, wherein automatically deriving, according to the one or more data mining algorithms, the hidden information of the cross-chain transaction from information of the first, second, third, and fourth HTLC transactions comprises automatically determining, according to the one or more data mining algorithms, the exchange of the cross-chain transaction to be an exchange between a transferred value in the first HTLC transaction and a transferred value in the second HTLC transaction, or an exchange ratio between the transferred value in the first HTLC transaction and the transferred value in the second HTLC transaction.

4. The computer-implemented method of claim 1, wherein determining, according to the one or more data mining algorithms, that the first HTLC transaction in the first blockchain network is associated with the second HTLC transaction in the second blockchain network comprises:

determining that a transaction commit time of the second HTLC transaction is later than a transaction commit time of the first HTLC transaction, and determining that a secret hash of the second HTLC transaction has a same value as a secret hash of the first HTLC transaction.

5. The computer-implemented method of claim 4, wherein determining, according to the one or more data mining algorithms, that the first HTLC transaction in the first blockchain network is associated with the second HTLC transaction in the second blockchain network further comprises at least one of:

determining that an expiration time of the first HTLC transaction is longer than a sum of an expiration time of the second HTLC transaction and a time threshold, or determining that a ratio between a transferred value of the first HTLC transaction and a transferred value of the second HTLC transaction is within a ratio range.

6. The computer-implemented method of claim 5, wherein the first blockchain network is associated with a first currency and the second blockchain network is associated with a second currency, and wherein the ratio range is predetermined by a variation of a ratio between the first currency and the second currency.

7. The computer-implemented method of claim 6, wherein the variation of the ratio between the first currency and the second currency is before the transaction commit time of the first HTLC transaction in the first blockchain network.

8. The computer-implemented method of claim 5, wherein the expiration time of the first HTLC transaction, the expiration time of the second HTLC transaction, and the time threshold are configured such that the third HTLC transaction associated with the second HTLC transaction is executed in the second blockchain network before the fourth HTLC transaction associated with the first HTLC transaction is executed in the first blockchain network.

9. The computer-implemented method of claim 1, wherein identifying determining, according to the one or more data mining algorithms, that the third HTLC transaction in the second blockchain network is associated with the second HTLC transaction in the second blockchain network comprises:
   determining that a transaction commit time of the third HTLC transaction is later than a transaction commit time of the second HTLC transaction,
   determining that a receiver address of the third HTLC transaction is same as a receiver address of the second HTLC transaction, and
   determining that a hash of a proof in the third HTLC transaction has a same value as a secret hash of the second HTLC transaction.

10. The computer-implemented method of claim 1, wherein determining, according to the one or more data mining algorithms, that a fourth HTLC transaction in the first blockchain network is associated with the first, second, and third HTLC transactions comprises:
   determining that a transaction commit time of the fourth HTLC transaction is later than a transaction commit time of the third HTLC transaction,
   determining that a proof in the fourth HTLC transaction is identical to a proof of the third HTLC transaction, and
   determining that a receiver address of the fourth HTLC transaction is same as a receiver address of the first HTLC transaction.

11. The computer-implemented method of claim 1, further comprising:
   determining that a transaction is an HTLC transaction by determining that the transaction is executed according to an HTLC protocol.

12. The computer-implemented method of claim 11, wherein determining that the transaction is executed according to the HTLC protocol comprises:
   determining that information of the transaction comprises a secret hash as a hash lock and an expiration time as a time lock, the transaction being configured to be abandoned after the expiration time such that a transferred value in the transaction is refunded.

13. The computer-implemented method of claim 1, further comprising:
   rendering the information of the first, second, third, and fourth HTLC transactions in a visualization on a user interface; and
   annotating the associations of the first, second, third, and fourth HTLC transactions in the visualization.

14. A non-transitory computer-readable medium storing one or more instructions executable by a computer system to perform operations for managing transactions in multiple blockchain networks using one or more data mining algorithms, the operations comprising:
   accessing transaction data stored in the multiple blockchain networks, the transaction data comprising transactions published in the multiple blockchain networks, each of the multiple blockchain networks comprising a respective network of computing nodes that manage, update, and maintain one or more blockchains, the multiple blockchain networks comprising a first blockchain network and a second blockchain network that are different from each other;
   determining, according to the one or more data mining algorithms, that a first Hash Time Locked Contract (HTLC) transaction published in the first blockchain network is associated with a second HTLC transaction published in the second blockchain network;
   determining, according to the one or more data mining algorithms, that a third HTLC transaction published in the second blockchain network is associated with the second HTLC transaction published in the second blockchain network;
   determining, according to the one or more data mining algorithms, that a fourth HTLC transaction published in the first blockchain network is associated with the first, second, and third HTLC transactions
   determining, according to the one or more data mining algorithms, that the first, second, third, and fourth HTLC transactions are related to a cross-chain transaction across the first blockchain network and the second blockchain network; and
   automatically deriving, according to the one or more data mining algorithms, hidden information of the cross-chain transaction from information of the first, second, third, and fourth HTLC transactions based on associations of the first, second, third, and fourth HTLC transactions, the hidden information of the cross-chain transaction comprising information of the first, second, third, and fourth HTLC transactions that is unpublished in the first blockchain network and the second blockchain network.

15. The non-transitory computer-readable medium of claim 14, wherein the information of each of the first and second HTLC transactions comprises at least one of a sender address, a receiver address, a transferred value, a transaction commit time, a secret hash, or an expiration time, and
   wherein the information of each of the third and fourth HTLC transactions comprises at least one of a sender address, a receiver address, a transferred value, a transaction commit time, or a proof.

16. The non-transitory computer-readable medium of claim 14, wherein the hidden information of the cross-chain transaction comprises at least one of:
   a first party of the cross-chain transaction, wherein automatically deriving, according to the one or more data mining algorithms, the hidden information of the cross-chain transaction from information of the first, second, third, and fourth HTLC transactions comprises automatically determining, according to the one or more data mining algorithms, the first party of the cross-chain transaction to have at least one of a sender address of the first HTLC transaction or a sender address of the third HTLC transaction,
   a second party of the cross-chain transaction, wherein automatically deriving, according to the one or more data mining algorithms, the hidden information of the cross-chain transaction from information of the first, second, third, and fourth HTLC transactions comprises automatically determining, according to the one or more data mining algorithms, the second party of the cross-chain transaction to have at least one of a sender address of the second HTLC transaction or a sender address of the fourth HTLC transaction, an exchange of the cross-chain transaction, wherein automatically deriving, according to the one or more data mining algorithms, the hidden information of the cross-chain transaction from information of the first, second, third, and fourth HTLC transactions comprises automatically determining, according to the one or more data mining algorithms, the exchange of the cross-chain transaction to be an exchange between a transferred value in the first HTLC transaction and a transferred value in the second HTLC transaction, or an exchange ratio between the transferred value in the first HTLC transaction and the transferred value in the second HTLC transaction.

17. The non-transitory computer-readable medium of claim 14, wherein determining, according to the one or more data mining algorithms, that the first HTLC transaction in the first blockchain network is associated with the second HTLC transaction in the second blockchain network comprises:

determining that a transaction commit time of the second HTLC transaction is later than a transaction commit time of the first HTLC transaction, and determining that a secret hash of the second HTLC transaction has a same value as a secret hash of the first HTLC transaction.

18. The non-transitory computer-readable medium of claim 17, wherein determining, according to the one or more data mining algorithms, that the first HTLC transaction in the first blockchain network is associated with the second HTLC transaction in the second blockchain network further comprises at least one of:

determining that an expiration time of the first HTLC transaction is longer than a sum of an expiration time of the second HTLC transaction and a time threshold, or determining that a ratio between a transferred value of the first HTLC transaction and a transferred value of the second HTLC transaction is within a ratio range.

19. The non-transitory computer-readable medium of claim 18, wherein the first blockchain network is associated with a first currency and the second blockchain network is associated with a second currency, and wherein the ratio range is predetermined by a variation of a ratio between the first currency and the second currency.

20. The non-transitory computer-readable medium of claim 19, wherein the variation of the ratio between the first currency and the second currency is before the transaction commit time of the first HTLC transaction in the first blockchain network.

21. The non-transitory computer-readable medium of claim 18, wherein the expiration time of the first HTLC transaction, the expiration time of the second HTLC transaction, and the time threshold are configured such that the third HTLC transaction associated with the second HTLC transaction is executed in the second blockchain network before the fourth HTLC transaction associated with the first HTLC transaction is executed in the first blockchain network.

22. The non-transitory computer-readable medium of claim 14, wherein determining, according to the one or more data mining algorithms, that the third HTLC transaction in the second blockchain network is associated with the second HTLC transaction in the second blockchain network comprises:

determining that a transaction commit time of the third HTLC transaction is later than a transaction commit time of the second HTLC transaction, determining that a receiver address of the third HTLC transaction is same as a receiver address of the second HTLC transaction, and determining that a hash of a proof in the third HTLC transaction has a same value as a secret hash of the second HTLC transaction.

23. The non-transitory computer-readable medium of claim 14, wherein determining, according to the one or more data mining algorithms, that a fourth HTLC transaction in the first blockchain network is associated with the first, second, and third HTLC transactions comprises:

determining that a transaction commit time of the fourth HTLC transaction is later than a transaction commit time of the third HTLC transaction, determining that a proof in the fourth HTLC transaction is identical to a proof of the third HTLC transaction, and determining that a receiver address of the fourth HTLC transaction is same as a receiver address of the first HTLC transaction.

24. The non-transitory computer-readable medium of claim 14, the operations further comprising:

determining that a transaction is an HTLC transaction by determining that the transaction is executed according to an HTLC protocol.

25. The non-transitory computer-readable medium of claim 24, wherein determining that the transaction is executed according to the HTLC protocol comprises:

determining that information of the transaction comprises a secret hash as a hash lock and an expiration time as a time lock, the transaction being configured to be abandoned after the expiration time such that a transferred value in the transaction is refunded.

26. The non-transitory computer-readable medium of claim 14, the operations further comprising:

rendering the information of the first, second, third, and fourth HTLC transactions in a visualization on a user interface; and annotating the associations of the first, second, third, and fourth HTLC transactions in the visualization.

27. A computer-implemented system for managing transactions in multiple blockchain networks using one or more data mining algorithms, the computer-implemented system comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations comprising:

accessing transaction data stored in the multiple blockchain networks, the transaction data comprising transactions published in the multiple blockchain networks, each of the multiple blockchain networks comprising a respective network of computing nodes that manage, update, and maintain one or more blockchains, the multiple blockchain networks comprising a first blockchain network and a second blockchain network that are different from each other;

determining, according to the one or more data mining algorithms, that a first Hash Time Locked Contract (HTLC) transaction published in the first blockchain network is associated with a second HTLC transaction published in the second blockchain network;

determining, according to the one or more data mining algorithms, that a third HTLC transaction published in the second blockchain network is associated with the second HTLC transaction published in the second blockchain network;

determining, according to the one or more data mining algorithms, that a fourth HTLC transaction published in the first blockchain network is associated with the first, second, and third HTLC transactions determining, according to the one or more data mining algorithms, that the first, second, third, and fourth HTLC transactions are related to a cross-chain transaction across the first blockchain network and the second blockchain network; and automatically deriving, according to the one or more data mining algorithms, hidden information of the cross-chain transaction from information of the first, second, third, and fourth HTLC transactions based on associations of the first, second, third, and fourth HTLC transactions, the hidden information of the cross-chain transaction comprising information of the first, second, third, and fourth HTLC transactions that is unpublished in the first blockchain network and the second blockchain network.

* * * * *

UNITED STATES PATENT AND TRADEMARK OFFICE
CERTIFICATE OF CORRECTION

PATENT NO. : 11,403,632 B2
APPLICATION NO. : 17/359464
DATED : August 2, 2022
INVENTOR(S) : Hui Fang et al.

It is certified that error appears in the above-identified patent and that said Letters Patent is hereby corrected as shown below:

In the Claims

Column 57, Line 13, in Claim 9, delete "identifying determining," and insert -- determining, --.

Signed and Sealed this
Twentieth Day of September, 2022

Katherine Kelly Vidal
*Director of the United States Patent and Trademark Office*